United States Patent [19]
Okada et al.

[11] Patent Number: 4,784,018
[45] Date of Patent: Nov. 15, 1988

[54] BELT TYPE CONTINUOUSLY VARIABLE TRANSMISSION SYSTEM

[75] Inventors: Mitsuhiko Okada, Toyota; Kunio Morisawa, Okazaki; Michitaka Kakamu; Nobuyuki Kato, both of Toyota, all of Japan

[73] Assignee: Toyota Jidosha Kabushiki Kaisha, Toyota, Japan

[21] Appl. No.: 170,104

[22] Filed: Mar. 7, 1988

Related U.S. Application Data

[63] Continuation of Ser. No. 738,189, May 28, 1985, abandoned.

[30] Foreign Application Priority Data

| May 28, 1984 | [JP] | Japan | 59-108216 |
| Nov. 29, 1984 | [JP] | Japan | 59-252531 |
| Nov. 30, 1984 | [JP] | Japan | 59-254907 |
| Dec. 11, 1984 | [JP] | Japan | 59-261243 |
| Dec. 11, 1984 | [JP] | Japan | 59-261244 |
| Dec. 11, 1984 | [JP] | Japan | 59-261245 |
| Dec. 14, 1984 | [JP] | Japan | 59-265023 |
| Dec. 19, 1984 | [JP] | Japan | 59-267757 |

[51] Int. Cl.$^4$ ............... B60K 41/12; F16H 37/00
[52] U.S. Cl. ....................... 74/689; 74/701; 474/18
[58] Field of Search .............. 74/785, 701, 689; 474/18, 28

[56] References Cited

U.S. PATENT DOCUMENTS

| 3,260,331 | 7/1966 | Borman, Jr. | 74/785 X |
| 4,335,629 | 6/1982 | Falzoni | 74/689 |
| 4,464,145 | 8/1984 | Kawamoto et al. | 474/28 |
| 4,467,670 | 8/1984 | Kawamoto | 74/689 |
| 4,526,062 | 7/1985 | Sakakibara et al. | 74/689 |

FOREIGN PATENT DOCUMENTS

| 0035806 | 9/1981 | European Pat. Off. | 74/701 |
| 0043641 | 1/1982 | European Pat. Off. | |
| 0064678 | 11/1982 | European Pat. Off. | |
| 0139578 | 5/1985 | European Pat. Off. | |
| 2948195 | 6/1980 | Fed. Rep. of Germany | |
| 60-37455 | 2/1985 | Japan | |
| 60-157554 | 8/1985 | Japan | |
| 2092686 | 8/1982 | United Kingdom | |

Primary Examiner—Dirk Wright
Attorney, Agent, or Firm—Oblon, Fisher, Spivak, McClelland, & Maier

[57] ABSTRACT

A belt type continuously variable transmission system which includes: a fluid coupling device for transmitting an output from an engine by use of fluid; a belt type continuously variable transmission device for transmitting an output from the fluid coupling device at a continuously variable transmission gear ratio through a belt; an auxiliary transmission device having a function of shifting an output from the belt type continuously variable transmission device in accordance with the forward reverse running conditions; a reduction gear device for reducing an output from the auxiliary transmission device; and an oil pump device for feeding the hydraulic pressures to various hydraulic pressure components such as a valve body and the like wherein the various devices are connected to one another while preventing the various devices from interfering with one another, whereby proper functions of the various devices are satisfactorily performed and the transmission system as a whole can be made simplified in construction and be compact in size.

7 Claims, 8 Drawing Sheets

BELT TYPE CONTINUOUSLY VARIABLE TRANSMISSION SYSTEM

This application is a continuation of application Ser. No. 738,189, filed on May 28, 1985, now abandoned.

BACKGROUND OF THE INVENTION

1. Field of the Invention

This invention relates to a belt type continuously variable transmission system for use in a vehicle such as a motor vehicle (hereinafter, "continuously variable transmission" being referred to briefly as "CVT").

2. Description of the Prior Art

As a transmission in a vehicle such as motor vehicle, there has recently been proposed a belt type CVT system (refer to Japanese Patent Application No. 144985/1983 for example).

For example, the belt type CVT system of this type comprises:

a fluid coupling device for transmitting an output from an engine by use of fluid;

a belt type CVT device for transmitting an output from the fluid coupling device at a transmission gear ratio of the continuous variation through a belt;

an anxiliary transmission device having a function of shifting an output from the belt type CVT device in accordance with the forward or backward running conditions;

a reduction gear device for reducing an output from the auxiliary transmission device;

an oil pump device for feeding the hydraulic pressures to a valve body and other various hydraulic components, and so forth.

In the belt type CVT device, an input pulley and an output pulley each having a circumferential groove of a V-shape in cross section are provided on a first and second rotary shaft, respectively, and a transmission belt is racked across the input pulley and the output pulley, being guided around the circumferential grooves of the both pulleys, respectively. The widths of the circumferential grooves of V-shape in cross section of the input and output pulleys are varied relative to each other, and a rotational force is transmitted from one rotary shaft to the other, being continuously variable.

With this belt type CVT device, it is possible to make a shift only in one rotational direction, and a shift in a reverse direction, namely, a shift from forward to reverse running cannot be performed. Because of this, in order to use this as a transmission in a vehicle such as a motor vehicle, an auxiliary transmission device having a forward-reverse shift transmission mechanism is provided on the belt type CVT device. The auxiliary transmission device is disposed on the rotary shaft of the pulley either the input side or the output side of the belt type CVT device. Since the belt type CVT system can be made compact in size, there have recently been many proposals in which the auxiliary transmission device is disposed at the output side. Furthermore, the auxiliary transmission device is provided thereon with a forward transmission mechanism of double reduction or so in the forward-reverse shift mechanism.

Because of this, in many cases, the auxiliary transmission device is formed by use of a planetary gear device, which has a clutch device and a braking device. The clutch device and the braking device of a friction multiplate engaging type in many cases, and operated by hydraulic pressures. Each of the clutch device and the braking device include a well-known hydraulic pressure servo device, and speed change can be obtained by selectively operating the clutch device and the braking device.

As well known, the planetary gear device is constituted by elements including a sun gear, planetary gears rotatably supported by carriers and a ring gear. The clutch device is connected to one of the aforesaid elements of the planetary gear device through a flange member on a disc, whereby the power transmission is performed. As one of these power transmitting arrangement, there is provided an arrangement wherein the flange member is connected to the sun gear of the planetary gear device.

Additionally, due to meshing engagement with the planetary gears, the sun gear normally generates a thrust force, and a thrust bearing to receive this thrust force is provided at a position on one side of the sun gear.

Furthermore, the carriers for rotatably supporting the planetary gears are disposed at positions opposite each other in the axial direction of the planetary gears. As a consequence, the carrier is disposed on the side, where the flange member connecting the clutch device to the sun gear is provided, at a position adjacent the flange member.

On the other hand, the braking device in the auxiliary transmission device is provided for fixing these elements of the planetary gear device to a case member. To fix the ring gear to the case member, the braking device is interposed between the ring gear and the case member. In general, the braking device is of a friction multiplate engaging type which is well known, in many cases, and a frictionally engageable member is pushed by a piston driven by hydraulic pressure, so that the ring gear is fixed to the case member. This piston is adapted to be coupled to a cylinder member for the operation, and, when the cylinder member is formed separately of the case member, the cylinder member is engaged with the case member in the axial direction through a cover ring. A thrust force of the cylinder member generated as a reaction force due to the working of the piston is received by the case member through the cover ring. It is further noted that the thrust force generated in the cylinder member is about 2 tons in value.

The ring gear of the planetary gear device is in meshing engagement with the planetary gears, and, since this meshing engagement is normally a helical meshing engagement, a thrust force is generated in the ring gear due to the meshing engagement. Conventionally, the thrust force generated in the ring gear is received by a case member, being different from the thrust force of a cylindrical member of the braking device. In passing, the thrust force generated in the ring gear is about 400 Kg in value, which is smaller in value than the thrust force generated in the cylindrical member.

When the belt type CVT device and the auxiliary transmission device are provided in the transmission system, the former together with the latter are normally housed and installed in one chamber formed by a case member. Since these two members are housed together, in many cases, power transmissions are integrally connected to each other in the former and the latter. Furthermore, a power transmission between these two components and another device may be integrally formed similarly to the above. More specifically, for example, a component part of the auxiliary transmission device is integrally mounted to a rotary shaft of the output pulley of the belt type CVT device, whereby the belt type CVT device and the auxiliary transmission device cannot be separated from each other.

Furthermore, a partition member may be provided between the auxiliary transmission device and the belt type CVT device to divide the two from each other. When this partition member is provided, the rotary shafts of the belt type CVT device are supported on this partition member through bearings. Various oil lines are formed in the partition member disposed as per the above-described position. For example, there is formed an oil line for feeding the hydraulic pressure to the clutch device of the auxiliary transmission device, which clutch is of the friction multi-plate engaging type. Additionally, there is provided an oil line for feeding the controlling hydraulic pressure to a hydraulic cylinder device of the belt type CVT device in communication with an oil line formed in the rotary shafts. Furthermore, a seal member for sealing oil lines is provided at a connecting portion where the oil lines formed in the partition member and the oil lines formed in the rotary shafts are interconnected.

Now, due to a requirement concerning the positional arrangement, the auxiliary transmission device may be provided at a position in the upper portion of a transmission system, being spaced apart from the position of oil located in the lower portion of the transmission system. For example, when the auxiliary transmission device is disposed at the output side of the belt type CVT device, since the oil pump is provided at the input side and disposed at a lower position close to the position of the oil pool, the output pulley, and the auxiliary transmission device are located at position located upward from a differential gear device and the like, whereby the auxiliary transmission device is provided in the upper portion of the transmission system.

Furthermore, the transmission system is provided with a hydraulic control device, to control the working of a hydraulic servo device of the auxiliary transmission device, to control the pulleys of the belt type CVT device, and further, to control a fluid coupling and a lock-up clutch when the transmission system includes the fluid coupling device with the lock-up clutch. The hydraulic control device is provided thereon with various valves including a pressure regulator value such as the pressure regulator valve for regulating the supplied hydraulic pressure and the like, and a shift valve for controlling the working of the hydraulic servo device of the auxiliary transmission device. These various valves are assembled into a valve body.

The valve body has been commonly provided in the lower portion of the transmission system and close to the oil pool. This is because it is preferable that the hydraulic pressure pumped up by an oil pump be regulated in pressure as soon as possible. However, the hydraulic servo device of the auxiliary transmission device is spaced apart from the valve body.

On the other hand, in general, to improve the transmission gear ratio obtainable from the belt type CVT device, the belt type CVT system is provided with a reduction gear device in addition to the aforesaid auxiliary transmission device. The reduction gear device is formed of an ordinary gear device wherein large and small gears different in diameter from one another are in meshing engagement with one another. This reduction gear device is commonly disposed on the output side of the belt type CVT device. Since the auxiliary transmission device is disposed on the output side immediately after the belt type CVT device, the reduction gear device is disposed on the downstream side of the auxiliary transmission device.

One of the rotary shafts of gears of the reduction gear device is provided coaxially with the rotary shaft of the output pulley of the belt type CVT device, and this rotary shaft of the reduction gear device is rotatably and integrally connected thereto with an output member, such as for example the carrier of the planetary gear device constituting the auxiliary reduction gear, whereby the power is transmitted from the auxiliary transmission device to the reduction gear device. In this case, commonly, the output member such as the carrier of the planetary gear device is inseparably and integrally formed with the rotary shaft of the reduction gear device in the axial direction, too.

Now, even in the case of a motor vehicle having a size of that of a common passenger vehicle in general, a load as high as 500 Kg or more acts on the transmission belt racked across the input pulley and the output pulley in the belt type CVT device during the transmission of the power, whereby a high load corresponding thereto acts on the input pulley and the output pulley, which are subjected to the load of this transmission belt.

On the other hand, the input pulley and the output pulley are rotatably supported by case members of the transmission system and the support thereof is effected by the support of rotary shafts of stationary pulleys. One end of the rotary shaft is directly supported by the case member of the transmission system through a bearing. Since, in general, other devices such as the auxiliary transmission device are provided on the other end of the rotary shaft as aforesaid, the other end of the rotary shaft is supported through a member or members of these other devices. Because of this, the supporting distance between opposite ends of the input pulley and the output pulley becomes relatively long, whereby the rigidity feature becomes low and the supporting accuracy is lowered because the rotary shaft is supported through the member or members of the aforesaid other devices.

As a result, since the conventional input and output pulleys are low in terms of supporting accuracy, deviations may occur from preset positions of the provision of the input and the output pulley, whereby the transmission belt may move in a zigzag fashion between the input pulley and the output pulley. Here, the deviations from the preset positions of the provision means deviations in position from the axes of the rotary shafts of the pulleys and the deviations in position in the axial direction of the rotary shafts.

When the input pulley and the output pulley are subjected to a high load during the transmission of the power as described above, since the supporting distance therebetween is long and the rigidity is low, a flexible deformation occurs in a direction of mutual approach, whereby a deviation may occur too. This deviation is added to the deviation from the aforesaid supporting accuracy, whereby the deviations at the positions of the provision of the input pulley and the output pulley are further increased, with the result that the transmission belt moves in a zigzag fashion to a further extent.

In general, the transmission belt is constituted by an endless carrier formed by laminating thin metallic hoops and power transmission metallic blocks, and a plurality of the power transmitting blocks are provided on the endless carrier in a manner to be tied in a row. When the thus formed transmission belt moves in a zigzag fashion, the hoops forming the endless carrier move in the lateral direction relative to the power transmitting blocks, end faces of the hoops abut against abutment portions of the power transmitting blocks, whereby the transmission belt suffers from fatigue, thus possibly presenting the disadvantage of lowered durability of the transmission belt.

Further, if the power transmission connection between the belt type CVT device and the auxiliary transmission device and between the above-mentioned components and another device are made integral and inseparable from each other, even when one of the belt type CVT device and the auxiliary transmission device is subjected to a replacement of parts or repair, the other device should be disassembled and assembled, thus presenting the disadvantage of undergoing troublesome replacement and repair.

Furthermore, when the hydraulic servo device of the auxiliary transmission device is spaced apart from the valve body, there may be presented the disadvantage that the transmission responsiveness of the auxiliary transmission device is low. This is because the operation hydraulic pressure is fed to the hydraulic servo device of the auxiliary transmission device through a valve such as a shift valve for controlling working of the auxiliary transmission device, which valve is provided in the valve body, and, in this case the working hydraulic pressure is fed through an orifice formed in an oil line disposed close to the valve. Because of this, when the valve body is spaced apart from the auxiliary transmission device, the distance from the orifice to the hydraulic servo device becomes long, thus possibly presenting the disadvantage that the shift responsiveness becomes low through the action of the orifice.

Further, when, in the transmission system provided with the belt type CVT device and the auxiliary transmission device, the partition member is interposed between the belt type CVT device and the auxiliary transmission device, and this partition member is provided therein with the bearings for supporting the rotary shafts of the pulleys and the oil lines for feeding the hydraulic pressure to the auxiliary transmission device and the belt type CVT device, there may be presented such disadvantages that sealing properties of the seal members provided at oil line connections between the oil lines formed in the partition member and the oil lines formed in the rotary shafts are worsened and the clutch device of the friction multi-plate engaging type is increased in the diametral direction thereof, depending upon the positions where the bearings are provided.

For example, when the positions where the bearings for supporting the rotary shafts of the pulleys are provided are located rather to the side of the auxiliary transmission device than the positions of the various oil lines formed in the partition member, the oil lines connecting portion between the oil lines formed in the partition member and the oil lines formed in the rotary shafts is located rather to the belt type CVT device than the positions of the bearings. In this case, the rotary shaft portion located rather to the belt type CVT device than the bearings, is subjected to flexible deformation of the pulleys due to the load of the transmission belt, whereby premature wear is generated on the seal member provided in the aforesaid oil line connecting portion, thus presenting the disadvantage of lowered sealing properties in the oil line connecting portion.

Furthermore, when the bearings are located at the above-mentioned positions, the oil lines leading to the clutch device are located at positions radially outwardly of the positions of the bearings, and the clutch device is further radially outwardly located, thus presenting the disadvantage that the clutch device is increased in the diametral direction thereof.

Further, when the cylinder member of the braking device is formed separately of the case member and engaged with the case member in the axial direction by the cover ring, the thrust force generated in the cylinder member is received by the case member through the cover ring. However, the thrust force generated in the cylinder member is generally large, whereby the cover ring suffers from fatigue prematurely, thus presenting the disadvantage that the braking device durability is lowered. Heretofore, the thrust force generated in the ring gear of the planetary gear device has been received directly by the case member unlike the thrust force of the cylinder member of the braking device. However, the construction, wherein the thrust force is received by this case member, may present the disadvantage that the construction is complicated because the ring gear and the braking device are disposed close to each other.

Furthermore, when, in the transmission system provided with the belt type CVT device and the auxiliary transmission device, the clutch device and the braking device are formed into friction multi-plate engaging types, the friction multi-plate engaging type requires a relatively large space. Hence, when the above-described transmission system is combined with the planetary gear device, the resultant transmission system becomes relatively large-sized.

The inlet pulley and the outlet pulley of the belt type CVT device are controlled by the hydraulic cylinder devices which are large-sized devices requiring relatively large spaces. In many cases, the hydraulic cylinder device for the inlet pulley and the auxiliary transmission device are disposed at positions interfering with each other. Because of this, the positional arrangement of the both devices constitutes one of the important factors in making the transmission system compact in size. Heretofore, the necessity has been voiced for making the transmission system mounted on a vehicle such as a motor vehicle as compact as possible. Particularly, there has been a strong requirement for making the transmission system compact in a front engine-front device (F—F) motor vehicle. Since there is a restriction imposed on the vehicle width in the F—F vehicle wherein an engine is mounted transversely, it has been difficult to realize it.

Additionally, the factors in making the transmission system of this type compact in size are constituted by decreasing the distance across the rotary shafts of the inlet and outlet pulleys to be as short as possible and making the axial length in the auxiliary transmission device as short as possible.

Further, when the clutch device and the sun gear of the planetary gear device are connected to each other through the flange member, if the flange member is connected to the sun gear under an ordinary arrangement, then there is presented the disadvantage that the axial length of the device becomes long. More specifically, in the case of connection under the ordinary arrangement, the carrier disposed on the side of the flange member, the flange member and a thrust bearing subjected to a thrust force of the sun gear are simply arranged in the axial direction, whereby the appropriate axial lengths of the above-described three elements are required for the arrangement of the device, thus presenting the disadvantage that the axial length becomes relatively long.

Furthermore, when the power transmission connection between the auxiliary transmission device and the reduction gear device is made integrally and inseparably in the axial direction, if the replacement of parts and repair are performed in the reduction gear device, then an adverse influence effect occurs on the auxiliary transmission device, whereby the auxiliary transmission device should also be disassembled and assembled, thus presenting the disadvantage of undergoing troublesome replacement of parts and repair. Furthermore, lubrication is required at lubricating portions such as bearing portions of the auxiliary transmission device, which are provided on the rotary shaft of the output pulley. Because of this, the provision of lubrication paths is required, however, since the auxiliary transmission device is interposed between the belt type CVT device and the reduction gear device, thus presenting the disadvantage that it is difficult to provide the lubricating paths.

Further, in general, the transmission system is provided with an oil pump device for feeding the hydraulic pressure to various hydraulic components such as a valve body. When this oil pump device is provided on a system of power transmission of the inlet pulley of the belt type CVT device, e.g. at a downstream position, a shaft for driving the oil pump device should be extended through the rotary shaft, thus presenting the disadvantage that the positional arrangement thereof becomes complicated.

SUMMARY OF THE INVENTION

A first object of the present invention resides in that the supporting accuracy and the rigidity of the rotary shafts of the input pulley and output pulley are improved, deviations at the positions of the provision of the input pulley and the output pulley are avoided or decreased, and the zigzag movement of the transmission belt is prevented or reduced, so that the durability of the transmission belt can be improved.

To achieve the above-described first object, the present invention contemplates that the rotary shafts of the stationary pulleys of the inlet pulley and the outlet pulley are directly supported by the case members provided at opposite side positions.

More specifically, to this end, the following measures will be taken.

Namely, such measures are taken that in the belt type CVT device, wherein the transmission belt is racked across the input pulley and the output pulley, both of which are constructed such that movable pulleys are axially movably coupled to the rotary shafts of the stationary pulleys, and, by changes in the effective diameters of the input pulley and the output pulley, rotation of the input pulley can be transmitted to the output pulley in a continuously variable manner, the case members are provided at the opposite side positions of the input pulley and the output pulley, and the rotary shafts of the stationary pulleys of the input pulley and the output pulley are supported by the case members provided at the opposite side positions.

As the result of taking the above-described measures, the input pulley and the output pulley are supported by the case members provided at the opposite side positions, respectively, of the transmission system, so that the supporting distance becomes shorter, whereby the rigidity is improved more than ever.

Furthermore, the rotary shafts of the stationary pulleys of the input pulley and the output pulley are directly supported by the case members of the transmission system at the opposite side positions, so that the supporting accuracy can be improved as compared with the case of the prior art, where the other end is supported through another member.

As described above, the supporting accuracies of the input pulley and the output pulley are improved and the rigidity is raised, with the result that the deviations from the positions of the provision of the input pulley and the output pulley are avoided or made smaller than before, so that the zigzag movement of the transmission belt can be prevented or reduced. As a consequence, lowered durability which has heretofore been caused by the zigzag movement of the transmission belt can be avoided or reduced and the durability of the transmission belt can be improved.

A second object of the present invention resides in the fact that the belt type CVT device and the auxiliary transmission device are disassembled and assembled separately of each other, so that the replacement of parts and repair can be easily performed.

To achieve the above-described second object, the present invention contemplates that the belt type CVT device and the auxiliary transmission device are housed in chambers on housings separate from each other, and the power transmission connections between the both devices and between the both devices and another device are detachably made.

More specifically, to this end, the following measures will be taken. Namely, such measures are taken that, in the transmission system including the belt type CVT device wherein the transmission belt is racked across the input pulley and the output pulley and the power is continuously variably transmitted from the input pulley to the output pulley and the auxiliary transmission device disposed on either the input side or the output side of the belt type CVT device and having at least the forward-backward shift mechanism, the belt type CVT device and the auxiliary transmission device are housed in a belt type CVT device or housing and an auxiliary transmission device chamber or housing, which are formed independent from each other by the case member, and the power transmission connections between the belt type CVT device and the auxiliary transmission device and between the above-mentioned two devices and another device are made detachable.

According to the above-described measures, the belt type CVT device and the auxiliary transmission device are housed and installed in the belt type CVT device chamber and the auxiliary transmission device chamber, which are independent from each other and the power transmission convention therebetween is detachable, so that the devices can be separately disassembled and assembled without rendering any adverse influence to the other device. As a consequence, in performing the replacement of parts and repair, only the device requiring the replacement of parts and repair can be selected as the object, so that the replacement of the parts and repair can be easily performed.

As shown in the specific form, the auxiliary transmission device is disposed at the downstream side relative to the belt type CVT device in the power transmission system, whereby the belt type CVT device is made rotatable only in one direction continuously, so that the durability of the transmission belt can be improved accordingly. Additionally, the amplification of the transmitting torque is performed at the downstream side, so that the capacity of the belt type CVT device can be reduced accordingly, and compactness can be realized.

A third object of the present invention resides in that even when the auxiliary transmission device, wherein the speed change is performed by the hydraulic servo device, is provided in the upper portion of the transmission system, so that the auxiliary transmission device is provided at a position spaced apart from the position of the oil pool provided in the lower portion of the transmission system, the transmission responsiveness of the auxiliary transmission device can be improved.

To achieve the above-described third object, the present invention contemplates that the valve body having the valve for controlling the operation of the auxiliary transmission device is divided and one of the divided portions is disposed at a position close to the auxiliary transmission device and in the upper portion of the transmission system.

More specifically, to this end, the following measures will be taken.

Namely, such measures are taken that the transmission system is provided with the belt type CVT device wherein the transmission belt is racked across the input pulley and the output pulley and the power is continuously variably transmitted to the output pulley and the auxiliary transmission device wherein the hydraulic servo device of the braking device and the clutch device are selectively actuated to achieve predetermined shift speeds, the auxiliary transmission device is provided at a position spaced apart from the position of the oil pool of the transmission system and in the upper portion of the transmission system, the valve body provided with various valves for controlling the shift conditions of the transmission system is divide into two bodies including a first valve body and a second valve body, the first valve body is provided at a position close to the oil pool and in the lower portion of the transmission system, the second valve body is provided at a position close to the auxiliary transmission device and in the upper portion of the transmission system, the first valve body is provided with a pressure regulator valve such as a pressure regulator valve for regulating the hydraulic pressures fed to various portions, and the second valve body is provided with valves such as a shift valve, for controlling the operation of the auxiliary transmission device.

According to the above-described measures, the second valve body provided with the various valves for controlling the operation of the auxiliary transmission device is disposed at a position close to the auxiliary transmission device and in the upper portion of the transmission system, whereby an oil line for feeding the working hydraulic pressure from the valve to the hydraulic control device of the auxiliary transmission device becomes far shorter than that in the case where the valve for controlling the operation of the auxiliary transmission device has been provided in a valve body disposed at a position close to the oil pool. Because of this, even when the orifice is provided at a position close to the valve, the hydraulic servo device can quickly operate in response to the feed of the working hydraulic pressure from the valve, and the auxiliary transmission device has a satisfactory shift responsiveness.

On the other hand, the first valve body provided with the pressure regulator valve for regulating the hydraulic pressure supplied is provided at a position close to the oil pool as usual, so that it can perform the satisfactory hydraulic control as before.

Further, since the valve body is divided into the two bodies including the first valve body and the second valve body, each of the individual valve bodies thus divided becomes smaller in size than the valve body which has not been divided, whereby the individual valve bodies thus divided can be installed, effectively utilizing small spaces, so that the transmission system as a whole can be made compact in size.

A fourth object of the present invention resides in that, even when the partition member is provided between the belt type CVT device and the auxiliary transmission device, the bearings for supporting the rotary shafts of the pulleys are provided on this partition member and the oil lines for the hydraulic pressure fed to the auxiliary transmission device and the belt type CVT device are formed in this partition member, the seal member provided on the oil line connecting portion can be prevented from having reduced sealing properties and the clutch device provided on the auxiliary transmission device can be made compact in size in the diametral direction thereof.

To achieve the above-described fourth object, the present invention contemplates that the positions of the bearings for supporting the rotary shafts of the pulleys are located rather to the side of the belt type CVT device than the positions of the oil lines formed in the partition member.

More specifically, to this end, the following measured will be taken.

Namely, such measures are taken that, in the transmission system including the belt type CVT device and the auxiliary transmission device, wherein the auxiliary transmission device having the clutch device of the friction multi-plate engaging type, being operated by the hydraulic pressure is provided on the rotary shaft of the pulley of the belt type CVT device, the rotary shafts of the pulleys are supported by the partition member interposed between the belt type CVT device and the auxiliary transmission device through the bearings, the oil lines for feeding the hydraulic pressure to the clutch device of the auxiliary transmission device are formed in the partition member, the oil lines for feeding the hydraulic pressure to the hydraulic cylinder device of the belt type CVT device are communicated with the oil formed in the rotary shafts, and the seal member is provided in the oil line connecting portion between the rotary shafts and the partition member, the bearings for supporting the rotary shafts of the pulleys of the belt type CVT device on the partition member are located rather to the side of the belt type CVT device than the positions of the oil lines formed in the partition member.

According to the above-described measures, the positions of the bearings are located rather to the side of the belt type CVT device than the position of the oil line connecting portion between the partition member and the rotary shafts, and, the flexible deformation of the pulley gives little adverse influence to the side of the auxiliary transmission device from the positions where the bearings are supported, whereby the oil line connecting portion is not subjected to the adverse influence of the flexible deformation of the pulley. As a result, the seal member provided at the oil line connecting portion is not subjected to the premature wear and is maintained in satisfactory condition for a long period of time, thereby preventing the sealing performance from being lowered for a long period of time.

Furthermore, oil lines for feeding the hydraulic pressure to the clutch device of the auxiliary transmission device can be led to a radially inward position of the partition member, so that the clutch device c,.an be made small in the radial direction, thus making the transmission system compact in size.

A fifth object of the present invention resides in that, even when the cylinder member of the braking device is separately formed of the case member and engaged with the case member through a cover ring, premature fatigue of the cover ring can be avoided so as to improve the durability of the cover ring, and the construction for receiving a thrust force of the ring gear of the planetary gear device can be simplified.

To achieve the above-described fifth object, the present invention contemplates that the direction of a thrust force generated in the cylinder member of the braking device is opposite to the direction of a thrust force generated in the ring gear of the planetary gear device and the cylinder member is abutted against the ring gear, to thereby offset the thrust forces.

More specifically, to this end, the following measures will be taken.

Namely, that such measures are taken that in the transmission system provided with the braking device of the friction multi-plate engaging type between the ring gear of the planetary gear device and the case member, the braking device is provided thereon with the cylinder member, to which a piston is coupled, formed separately of the case member, the cylinder member is engaged with the case member through the cover ring in the axial direction, whereby the thrust force generated in the cylinder member is received by the case member, and the ring gear of the planetary gear device is disposed to generate the thrust force in a direction opposite to the thrust force generated in the cylinder member, whereby the cylinder member and the ring gear are abutted against each other to thereby receive the thrust forces in the directions opposite to each other.

According to the above-described measures, the thrust force generated in the ring gear of the planetary gear device is received by the cylinder member of the braking device, whereby the thrust force generated in the cylinder member is decreased in value by the thrust force generated in the ring gear. Because of this, the load acting on the cover ring receiving the thrust force of the cylinder member is decreased in value by the thrust force of the ring gear as compared with the case of the conventional transmission system. As a result, the load acting on the cover ring for engaging the cylinder member with the case member can be reduced, so that the premature fatigue of the cover ring can be avoided and the durability of the braking device can be improved.

Furthermore, the ring gear of the planetary gear device can receive the thrust force of the cylinder member only by being abutted against the cylinder member, so that the construction thereof for receiving the thrust force can be a relatively simple one as compared with the case of the conventional transmission system.

A sixth object the present invention resides in that, even when the auxiliary transmission device is provided with the clutch device and the braking device of the friction multi-plate engaging type so that the belt type CVT device is provided with the hydraulic cylinder device, the transmission system can be made compact in size.

To achieve the above-described sixth object, the present invention contemplates that the positional arrangements of the clutch device and the braking device of the friction multi-plate engaging type for use in the auxiliary transmission device are contrived and the shape of the partition member partitioning the belt type CVT device chamber from the auxiliary transmission device chamber is contrived.

More specifically, to this end, the following measures will be taken.

Namely, such measures re taken that, in the transmission system provided with the belt type CVT device and the auxiliary transmission device, the partition member for partitioning the belt type CVT device chamber for housing the belt type CVT device from the auxiliary transmission device chamber for housing the auxiliary transmission device has a stepped portion including a first small diameter stepped portion and a second large diameter stepped portion in the looking from the auxiliary transmission device chamber, the hydraulic cylinder device of the input pulley is disposed in the belt type CVT device chamber opposed to the first stepped portion, the clutch device of the friction multi-plate engaging type is disposed in the auxiliary transmission device chamber opposed to the first stepped portion, and the braking device of the friction multi-plate engaging type is disposed in the auxiliary transmission device chamber opposed to the second stepped portion, the braking device being located radially outwardly of the planetary gear device.

According to the above-described measures, firstly, the hydraulic cylinder device of the input pulley is disposed in the belt type CVT device chamber opposed to the first small diameter stepped portion in looking from the side of the auxiliary transmission device chamber, so that the distance between the shafts of the input pulley and output pulley is made as short as possible.

Next, the braking device of the friction multi-plate engaging type is disposed radially outwardly of the planetary gear device in the auxiliary transmission device chamber opposed to the second large diameter stepped portion when looking from the side of the auxiliary transmission device, so that the axial length of the auxiliary transmission device can be made short as compared with the case where the braking device is arranged axially with the planetary gear device. In consequence, the transmission system can be made compact in size.

A seventh object of the present invention resides in that, even when the clutch device is connected to the sun gear of the planetary gear device through the flange member, the axial length thereof can be made short.

To achieve the above-described seventh object, the present invention contemplates that a hollow space is formed between the carrier and the sun gear on the side where the flange member is disposed, the sun gear is connected to the flange member in this hollow space.

More specifically, to this end, the following measures will be taken.

Namely, in this invention, such measures are taken that, in the power transmission mechanism of the transmission system provided with the planetary gear device and the clutch device of the friction multi-plate engaging type and the planetary gear device includes the sun gear, the planetary gears supported by the carriers and the ring gear, and the clutch device is connected to the sun gear of the planetary gear device through the disc-shaped flange member, the carrier on the side where the flange member is disposed to form a hollow space between the sun gear and itself and the flange member is connected to the sun gear in this hollow space.

According to the above-described measures, the connection between the sun gear and the flange member is made within the axial length portion of the carrier in the hollow space formed between the carrier and the sun gear. As a result, the connection is made within the axial length of the carrier, whereby the axial length of the transmission system can be made shorter by the axial length of the carrier, so that the transmission system can be made compact in size.

An eighth object of the present invention resides in that, even when the auxiliary transmission device additionally provided on the belt CVT device is disposed at a position between the belt type CVT device and the reduction gear device, the formation of a lubrication path for lubricating the auxiliary transmission device can be simplified and the replacement of parts and repair of the reduction gear device can be performed without generating an adverse effect on the auxiliary transmission device.

To achieve the above-described eighth object, the present invention contemplates that an output member of the auxiliary transmission device and the rotary shaft of the reduction gear device are connected to each other in a manner so as to be integral in the rotating direction, but to be detachable in the axial direction, and the rotary shaft of the output pulley and the rotary shaft of the reduction gear device are coaxially arranged, both shafts being coupled to each other in a manner so as to be rotatable relative to each other, and a lubrication path communicating both shafts with each other is provided.

More specifically, to this end, the following measures will be taken.

Namely, such measures are taken that the auxiliary transmission device constituted by the planetary gear device is disposed on the rotary shaft of the output pulley of the belt type CVT device, the rotary shaft of the reduction device is coupled to the rotary shaft of the output pulley in a manner so as to be coaxially with, detachable from and rotatable relative to each other, a lubrication path opening at the end of the rotary shaft of the reduction gear device communicates the rotary shaft of the reduction gear device with the rotary shaft of the output pulley, the seal member is provided at the coupled portion between the rotary shaft of the reduction gear device and the rotary shaft of the output pulley, and the output member of the planetary gear device of the auxiliary transmission device is spline-coupled to the rotary shaft of the reduction gear device in a manner to be integral in the retracting direction, but detachable from each other in the axial direction.

According to the above-described measures, the rotary shaft of the reduction gear device is coupled to the rotary shaft of the output pulley and the output member of the auxiliary transmission device such as the carrier in a manner to be detachable from each other in the axial direction, so that the reduction gear device can be disassembled and assembled without adverse influence to the auxiliary transmission device. In consequence, the replacement of parts and repair in the reduction gear device can be readily performed.

Furthermore, the feed of the lubricant to the lubricated portion of the auxiliary transmission device is performed through the lubrication path extending through the rotary shaft of the reduction gear device and the rotary shaft of the output pulley and both rotary shafts are coupled to each other. The lubricant for this lubrication path is fed from the shaft end of the reduction gear device, where the lubrication path has an opening. Therefore, the lubrication path can be simplified in construction.

Additionally, the seal member is provided at the coupled portion between the rotary shaft of the reduction gear device and the rotary shaft of the output pulley, the lubrication path is made oil-tight and a satisfactory feed of the lubricant is ensured.

A ninth object of the present invention resides in that the oil pump device for feeding the hydraulic pressure to the various hydraulic components is assembled compactly into the transmission system, so that the transmission system can be simplified in construction.

To achieve the above-described ninth object, the present invention contemplates that, in relation to the fluid coupling device, the oil pump device is interposed between the fluid coupling device and the belt type CVT device.

More specifically, to this end, the following measures will be taken.

Namely, such measures are taken that, in the belt type CVT system including the fluid coupling device for transmitting an output of engine by use of fluid, the belt type CVT device for transmitting an output of the fluid coupling device through the belt at a transmission gear ratio of the continuous variation and the oil pump device for feeding the hydraulic pressure to the various hydraulic components, the oil pump device is provided between the output side of the fluid coupling device and an input side of an input pulley in a manner so as to be coaxial with and adjacent to the fluid coupling device.

According to the above-described measures, the necessity for extending the rotary shaft for driving the oil pump device through the rotary shaft of the belt type CVT device, etc. is eliminated to thereby simplify the arrangement. Further, the rotary shaft can be utilized for other purposes such as, for example, forming various oil lines. As a result, the various parts in the transmission system can be effectively utilized accordingly.

As shown in the specific forms, the fluid coupling device together with the oil pump device can be mounted in a manner to be detachable from the belt type CVT device, so that the fluid coupling device and the oil pump device can be detached separately of the belt type CVT device for the replacement of parts, repairing, etc.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Description will hereunder be given of one embodiment of the present invention with reference to the drawings.

FIG. 1 through 5 show one embodiment of the present invention.

Figure 1:
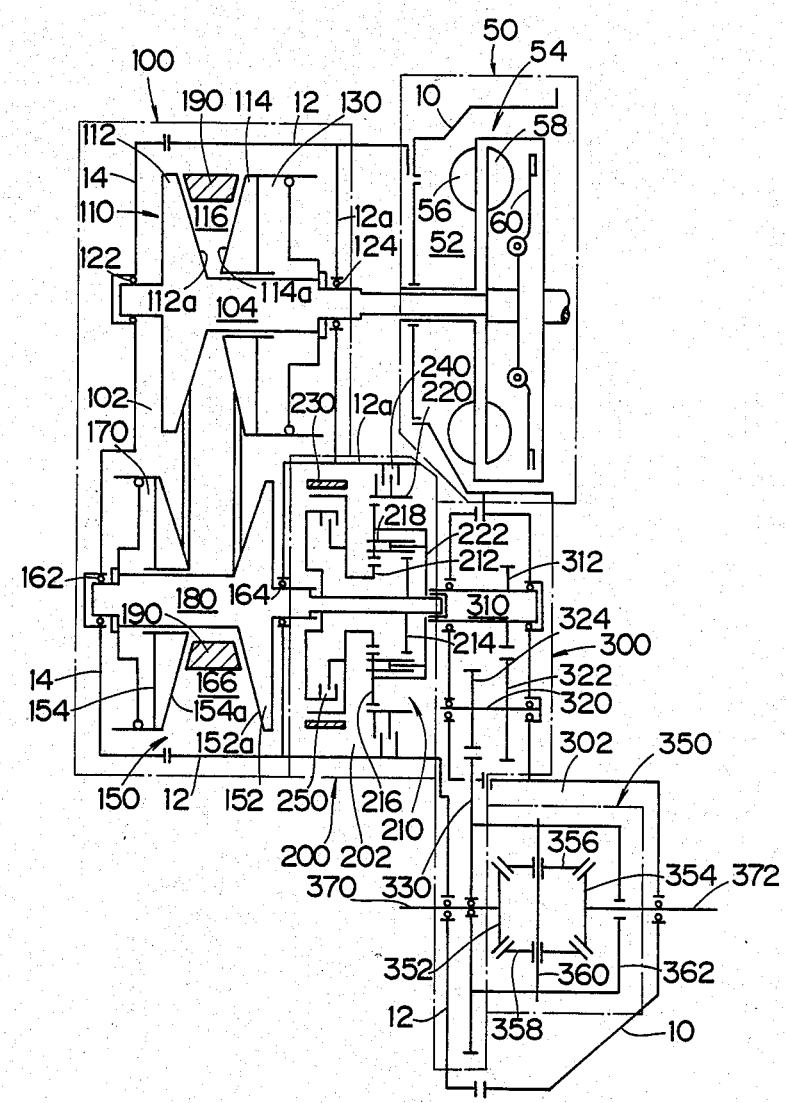
FIG. 1 is a skeleton view showing one embodiment of the present invention.

As shown in FIG. 1, this embodiment principally includes a fluid coupling device 50, an oil pump device 70, a belt type CVT device 100, an auxiliary transmission device 200, a reduction gear device 300 and a differential gear device 350.

These devices are provided in the case members of a transmission system. The case members include a fluid coupling case member 10, a main case member 12 and a cover member 14.

These case members form chambers for housing various devices. The fluid coupling case member 10 forms a fluid coupling device chamber 52, in which is housed the fluid coupling device 50. The main case member 12 and, the cover member 14 form a belt type CVT device or housing 102, in which is housed the belt type CVT device 100. Referring to FIG. 1, in the lower portion of the main case member 12, the main case member 12 forms an auxiliary transmission device chamber or housing 202, in which is housed the auxiliary transmission device 200. Further, referring to FIG. 1, in the lower portion of the fluid coupling case member 10, the fluid coupling case member 10 forms a differential gear case 302, in which are housed a reduction gear device 300 and a differential gear device 350.

Description will now be given of the various devices.

The fluid coupling device 50.

The fluid coupling device 50 includes a fluid coupling 54 and a lock-up clutch 60. The fluid coupling 54 includes a pump vane wheel 56 and a turbine wheel 58. The pump vane wheel 56 is connected to an engine (not shown), and the turbine wheel 58 is connected to a rotary shaft 104 of an input pulley 110, which serves as an input shaft of the belt type CVT device 100. As is well known, the fluid coupling 54 performs power transmission by use of a fluid (oil), and transmits the rotary force of the engine to the belt type CVT device 100.

The lock-up clutch 60 transmits the rotary force of the engine to the rotary shaft 104 of the input pulley 110 as is, through its operation. When the power transmission is made through the fluid coupling 54, transmission is made with reduction due to slippage because of the fluid power transmission. When the lock-up clutch 60 is used, the power is transmitted as is with no slippage. This lock-up clutch 60 is equipped to improve the so-called fuel consumption rate, and is normally operated during running of the vehicle at high speed.

The oil pump device 70.

Figure 2A:
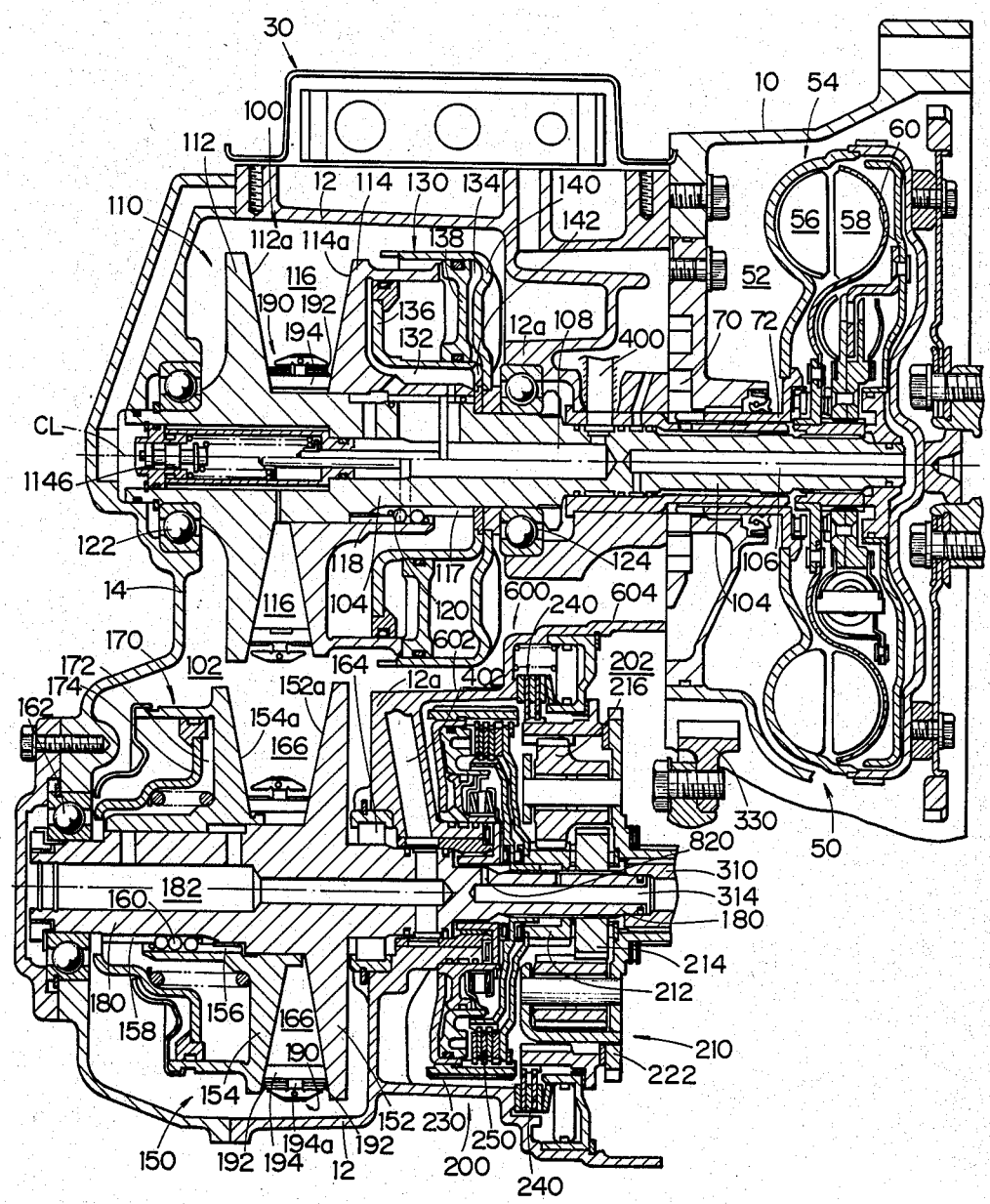
FIG. 2 shows the construction of the above embodiment in detail, FIG. 2(a) being a sectional view showing the arrangement of the upper portion of FIG. 1 and FIG. 2(b) being a sectional view showing the arrangement of the lower portion of FIG. 1.
Figure 2B:
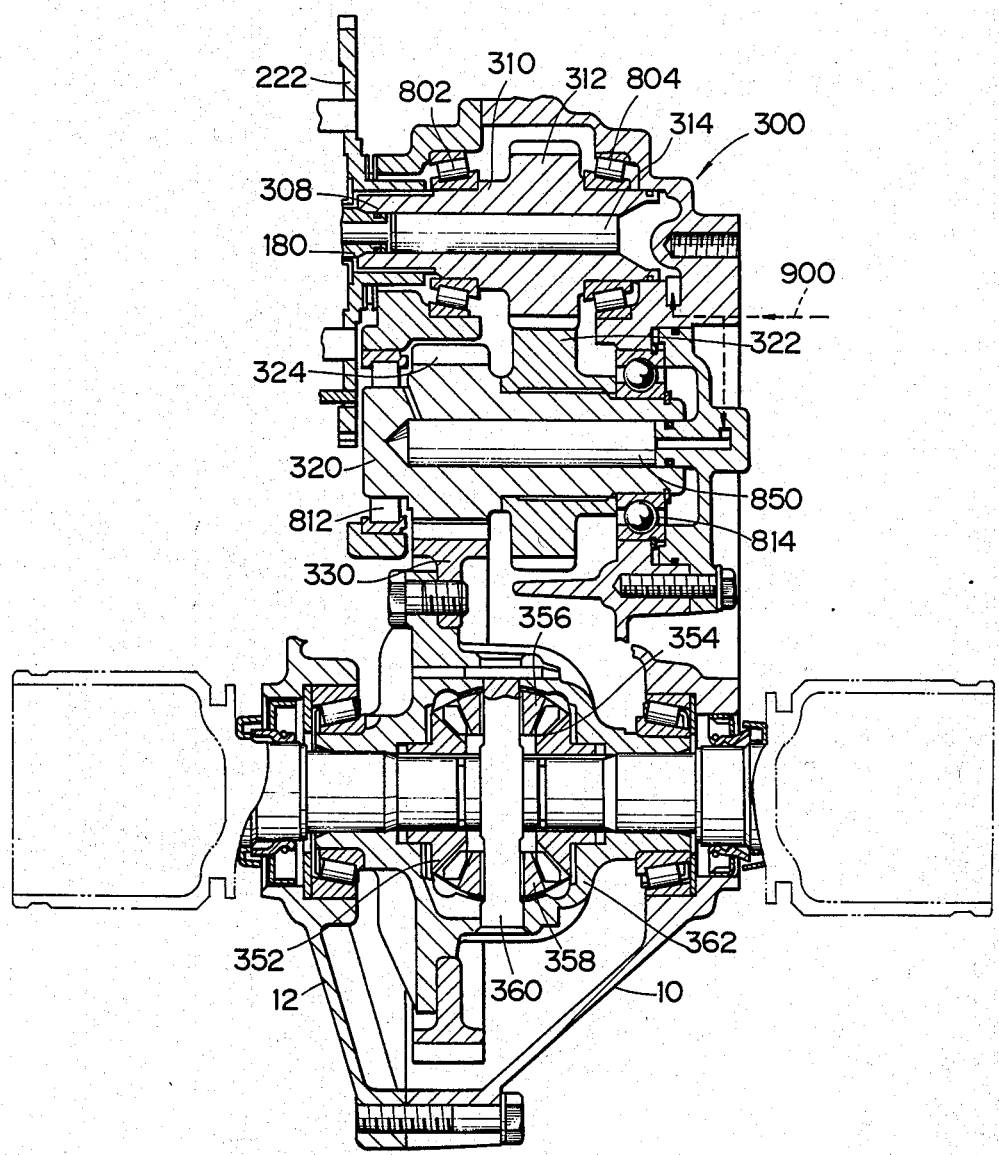

As shown in FIG. 2(a), the oil pump device 70 is disposed at a position rearwardly of the fluid coupling 54 (to the left position in FIG. 2(a)). The oil pump device 70 is driven by a rotation transmitting member 72 integral with the pump vane wheel 56, to thereby generate the hydraulic pressure. This hydraulic pressure is utilized for controlling the belt type CVT device 100 and controlling the auxiliary transmission device 200, both of which will be described hereunder. The hydraulic pressure is also utilized for lubrication.

The oil pump device 70 of this type may be provided at a position rearwardly of the input pulley 100 (to the left position of the belt type CVT device 100 in FIG. 2(a)). However, in this case, a shaft for driving the oil pump device 70 should extend through the rotary shaft 104, whereby the positional arrangement of these shafts becomes complicated. However, in this embodiment, the oil pump device 70 is provided at the position immediately rearwardly of the fluid coupling 54, so that the positional arrangement can be simplified, and all the more, an axis portion of the rotary shaft 104 can be utilized for other purposes. For example, the axis portion can be used for forming various oil lines. In this embodiment, the rotary shaft 104 is formed therein with an oil line 106 which leads to the fluid coupling 54 and an oil line 108 for feeding the working hydraulic pressure to control the input pulley 110.

Additionally, the fluid coupling device 50 is housed in the independent fluid coupling device chamber 52 formed by the fluid coupling case member 10, and the turbine wheel 58 of the fluid coupling 54 and the lock-up clutch 60 are spline-coupled to the rotary shaft 104 in a manner to be integral in the rotating direction, and slidable in the axial direction, whereby, when the fluid coupling case member 10 is removed from the engine mount (not shown) the fluid coupling device 50 is independently removed and the replacement of parts, repairing, etc. can be performed without any adverse influence on the assembled state of the belt type CVT device 100.

Figure 4:
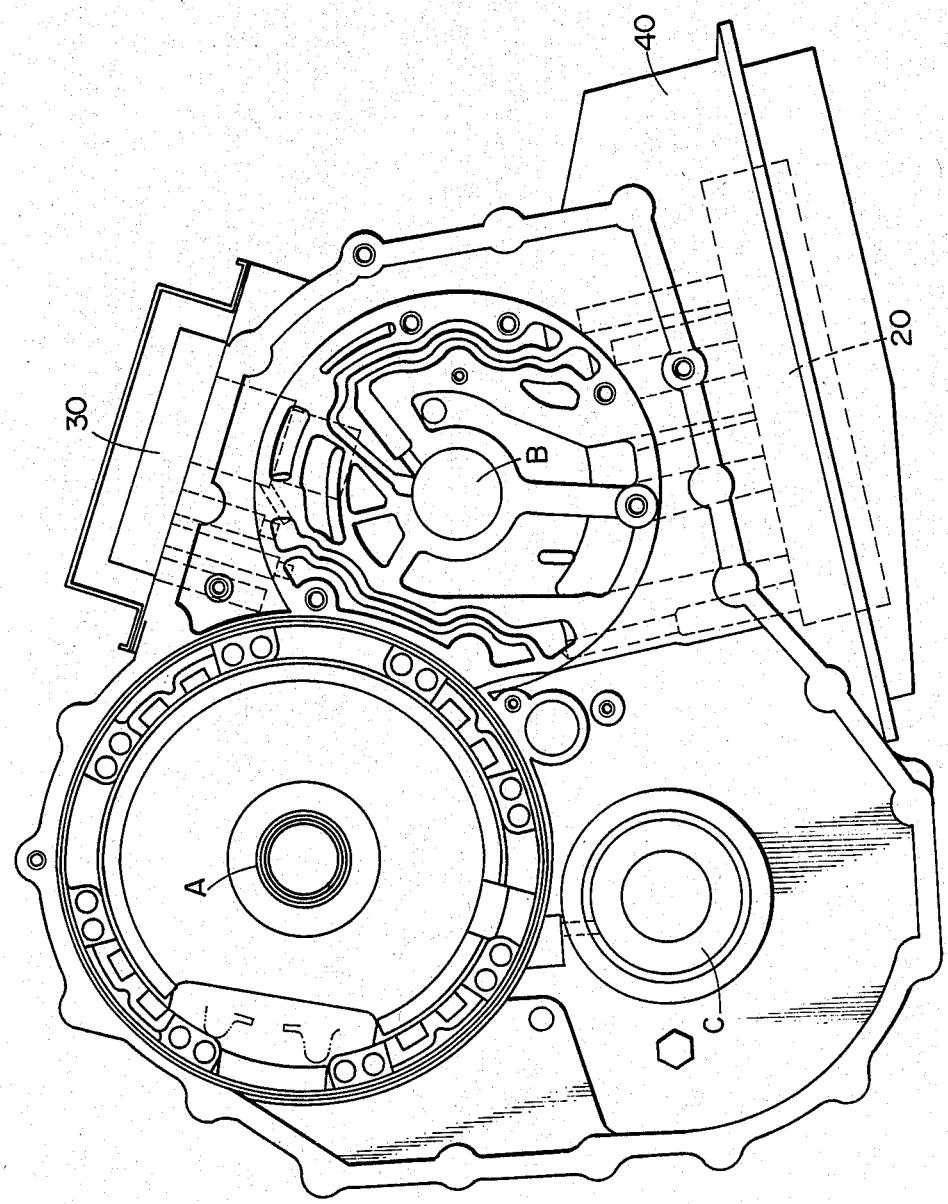
FIG. 4 is a side view showing the positional arrangement.

Referring to FIG. 4, the fluid, coupling device 50 is disposed at a position B. As a result, the oil pump device 70 is also disposed at the position B, which is adjacent an oil pool position 40 in the lower portion of the transmission system. The oil pump device 70 pumps up the oil to generate the hydraulic pressure and feed the same to a first valve body 20 to be described hereunder.

The belt type CVT device 100.

The belt type CVT device 100 includes the input pulley 110 and an output pulley 150. The input pulley 110 and the output pulley 150 are provided on the rotary shafts 104 and 180, respectively, which are arranged in parallel to each other. The input pulley 110 is provided coaxially with the fluid coupling device 50, whereby, referring to FIG. 4, the input pulleys 110 is disposed at the position B. The output pulley 150 is disposed at a position A in the upper portion of the transmission system. The reason why the output pulley 150 is provided in the upper portion of the transmission system is that the differential gear device 350 to be described hereunder is provided in the lower portion of the transmission system (a position C in FIG. 4) due to the connection with wheels.

The input pulley 110 includes a stationary pulley sheave 112 and a movable pulley sheave 114. The stationary pulley sheave 112 is formed integrally on the rotary shaft 104 and the movable pulley 114 is coupled to this rotary shaft 104. As shown well in FIG. 2(a), balls 120 are engaged in axial grooves 117 and 118 formed in the rotary shaft 104 and the movable pulley sheave 114, respectively, whereby, the movable pulley sheave 114 is axially movable relative to the rotary shaft 104, but integral with the rotary shaft 104 in the rotating direction.

The rotary shaft 104 of the input pulley 110 is rotatably supported by a partition member 12a of the main case member 12 and the cover member 14 from opposite sides through bearings 122 and 124.

Opposing pulley surfaces 112a and 114a of the stationary pulley sheave 112 and the movable pulley sheave 114 are formed into a circumferential groove 116 being of a V-shape in cross section. A transmission belt 190 is guided around the circumferential groove 116. The width of the circumferential groove 116 is varied in association with the axial movement of the movable pulleys 114, whereby an effective diameter, on which the transmission belt 190 is guided around, is variable. In FIG. 2(a), the input pulley 110 is illustrated such that the effective diameters thereof are different from each other above and below a center line CL thereof. The upper half shows the minimum effective diameter condition of the transmission belt 190 and the lower half shows the maximum effective diameter condition.

The movable pulley sheave 114 is movable in the axial direction by the hydraulic cylinder device 130 disposed therebehind. As shown in FIG. 2(a), the hydraulic cylinder device 130 includes a first working oil chamber 132 and a second working oil chamber 134. The first working oil chamber 132 is defined by the movable pulley 114 and a first working oil chamber forming member 136. The second working oil chamber 134 is defined by a piston 138 a second working oil chamber forming member 140. The hydraulic pressure is fed to and removed from the first working oil chamber 132 and the second working oil chamber 134, whereby the movable pulley sheave 114 is moved in the axial direction. Referring to FIG. 2(a), the condition of the upper half of the hydraulic cylinder device 130 shows the condition where the working hydraulic pressure is removed, whereby the input pulley 110 has the minimum effective diameter. The condition of the lower half shows the condition where the maximum working hydraulic pressure is fed, whereby the input pulley 110 has the maximum effective diameter.

The working hydraulic pressure starts from the first working oil chamber 132, is passed through a communicating port 142 and fed to the second working chamber 134. The first working oil chamber 132 and the second working oil chamber 134 are adapted to operate at the same time. The reason why the two working oil chambers including the first working oil chamber 132 and the second working oil chamber 134 are provided is to increase the working area of the working hydraulic pressure.

Additionally, the feed of the working hydraulic pressure to the first working oil chamber 132 and the second working oil chamber 134 of the hydraulic cylinder device 130 is performed through an oil line 108 formed in the rotary shaft 104. Furthermore, the working hydraulic pressure is fed to the oil line 108 from an oil line 400 formed in the partition member 12a of the case member 12.

An output pulley 150 has a construction substantially similar to the input pulley 110. More specifically, the output pulley sheave 150 includes a stationary pulley 152 and a movable pulley sheave 154. The movable pulley sheave 154 is coupled to a rotary shaft 180 integral with the stationary pulley sheave 152. Similarly to the case of the movable pulley sheave 114 of the input pulley sheave 110, the movable pulley 154 is mounted to the rotary shaft 180 through axial grooves 156, 158 and the balls 160 in a manner to be integral with each other in the rotating direction, but movable relative to each other in the axial direction. In the case of the output pulley sheave 150, the arrangement of the stationary pulley 152 and the movable pulley sheave 154 is converse in the lateral direction to the case of the input pulley 110. This is because the posture of the transmission belt 190 is made to be a straight line when the widths of the circumferential grooves 116 and 166 of the input pulley 110 and the output pulley 150 are varied.

Similarly to the case of the input pulley 110, the rotary shaft 180 of the output pulley 150 is supported by the partition member 12a of the main case member 12 and the cover member 14 from opposite sides through bearings 162 and 164. Referring to FIG. 2(a), the right end portion of the rotary shaft 180 is formed separately of the auxiliary transmission device 200 to be described hereunder and an output shaft 310 of the reduction gear device 300 so that the right end portion of the rotary shaft 180 can be drawn out of these devices. Namely, the rotary shaft 180 is detachable from these devices.

Furthermore, opposing pulley surfaces 152a and 154a of the stationary pulley sheave 152 and the movable pulley sheave 154 are formed as a circumferential groove 166 being of a V-shape in cross section, and the transmission belt 190 is guided around this circumferential groove 166 of the output pulley 150 and the circumferential groove 116 of the input pulley 110.

In the case of the output pulley 150 also, the effective diameter of a position, on which the transmission belt 190 is guided around, is variable by the movement of the movable pulley sheave 154 in the axial direction. Referring to FIG. 2(a), the upper half portion of the output pulley 150 illustrates the minimum effective diameter condition and the lower half portion illustrates the maximum effective diameter condition.

The movable pulley sheave 154 is movable in the axial direction by the hydraulic cylinder device 170 disposed therebehind. The hydraulic cylinder device 170 includes a working oil chamber 172. The working oil chamber 172 is defined by the movable pulley sheave 154 and a working oil chamber forming member 174. The working oil chamber 172 is supplied with the working hydraulic pressure, and the effective diameter of the output pulley 150 is forcedly changed due to a change in the effective diameter of the input pulley 110. The working hydraulic pressure of this working oil chamber 172 is fed or removed in accordance with changes in the effective diameter of this output pulley 150.

The feed of the working hydraulic pressure to the working oil chamber 172 is performed through an oil line 182 formed in the axis portion of the rotary shaft 180, and the working hydraulic pressure is fed to the oil line 182 through an oil line 402 formed in the partition member 12a of the main case member 12.

As shown in FIG. 2(a), the transmission belt 190 includes endless carriers 192 and power transmitting blocks 194. The endless carriers 192 are formed by laminating a plurality of thin metallic hoops. A plurality of the power transmitting blocks 194 are provided on each of a pair of the endless carriers 192 thus formed in a manner to be tied in a row, to thereby form the transmission belt 190.

The belt type CVT device 100 is constructed as described above, whereby the power transmission is conducted from the input pulley 110 to the output pulley 150 through the transmission belt 190. In this case, the effective diameter of the input pulley 110 is varied, whereby the power is transmitted to the output pulley 150 in the continuous variation.

Now, in the above-described belt type CVT device 100, both the inlet pulley 110 and the output pulley 150, the rotary shaft 104 integral with the stationary pulley 112 and the rotary shaft 180 integral with the stationary pulley 152 are directly supported by the partition member 12a of the main case member 12 and the cover member 14 from the opposite sides, so that the accuracies of supporting the input pulley 110 and the output pulley 150 can be improved. Namely, in general, the end portions of the rotary shafts 104 and 180 on one side have heretofore been directly supported by the case member of the transmission system through bearings, however, for the end portions on the other side, there has not been provided any case member, and instead, there have been provided other devices such as the auxiliary transmission device. Therefore, the end portions on the other side have been supported by a member or members of other devices. Because of this, the supporting distance across the opposite ends of the input pulley 110 and the output pulley 150 has become long, whereby the rigidity has been lowered and the supporting accuracies have been deteriorated because of the support through other members. However, in this embodiment, both the input pulley 110 and the output pulley 150 are directly supported by the case members at opposite sides, so that the supporting distance is made short and the rigidity is improved as compared with the case where both rotary shafts are supported through other members as in the prior art.

As a result, the input pulley 110 and the output pulley 150 are provided at predetermined positions with high accuracies, and, during the power transmission, shifts of the pulleys from the positions of provision can be prevented or reduced because deflections of the pulleys due to the load of the transmission belt 190 are avoided or reduced. As the result, the transmission belt 190 can perform rotatable movement on a straight line without any zigzag movement, so that the transmission belt 190 can be improved in terms of durability.

More specifically, during the rotatable movement in the zigzag fashion of the transmission belt 190, the hoops forming the endless carriers 192 move in the lateral direction and the end faces of the hoops abut against a neck portion 194a as an abutting portion of the power transmitting blocks 194 to cause fatigue to the neck portion 194a, whereby the transmission belt 190 is lowered in durability. However, during the rotatable movement on the straight line of the transmission belt 190, the hoops of the endless carriers 192 do not move in the lateral direction, whereby the end faces of the hoops do not abut against the neck portion 194a of the power transmitting blocks 194, so that the neck portion 194a can avoid fatigue and the transmission belt 190 is improved in terms of durability.

Further, the belt type CVT device 100 is housed in the independent belt type CVT device chamber 102 defined by the main case member 12 and the cover member 14, whereby, when the cover member 14 is removed from the main case member 12, the belt type CVT device 100 can be independently removed for the replacement of parts and repairing without any adverse influence to the assembled states of the other devices such as the fluid coupling device 50 or the auxiliary transmission device 200. More specifically, the rotary shaft 104 of the input pulley 110 is extended to the fluid coupling device 50, but detachably spline-coupled to a connecting member of the fluid coupling device 50, and the rotary shaft 180 of the output pulley 150 is extended to the auxiliary transmission device 200 to be described hereunder, but detachably spline-coupled to a second sun gear 214 as being a connecting member of the auxiliary transmission device 200, so that the belt type CVT device 100 can be independently disassembled and assembled without giving any adverse influence to the other devices.

Furthermore, mounting portions of the bearings 122 and 124 supporting the input pulley 110 to the cover member 14 and the partition member 12a of the main case member 12 can be worked in one and tee same axis of working by moving a working tool along an axial line of the rotary shaft 104 in a state where the main case member 12 is assembled with the cover member 14, so that the input pulley 110 can be supported, being reliably center-aligned. As for the output pulley 150, the working similar to the above can be performed at mounting portions where the bearings 162 and 164 supporting the output pulley 150 are mounted to the cover member 14 and the partition member 12a of the main case member 12, so that the output pulley 150 can be supported, being reliably center-aligned. Additionally, it is efficient that the working at the mounting portions of the input pulley 110 and the output pulley 150 are performed by use of two working tools at the same time.

Further, the working hydraulic pressure is fed to the hydraulic cylinder device 130 of the input pulley 110 and to the hydraulic cylinder device 170 of the output pulley 150 such that oil lines are formed in the partition member 12a of the main case member 12 and, from these oil lines, feeding of the working hydraulic pressure is performed through the oil line 108 and the oil line 182 formed in the rotary shafts 104 and 180, respectively, so that the arrangement of the oil lines can be simplified. Namely, when there would be no partition member 12a, the oil lines should be formed in the cover member 14 or the like, thus resulting in complicated oil line arrangement.

The auxiliary transmission device 200.

The auxiliary transmission device 200 is provided at the output side of the belt type CVT device 100. More specifically, the auxiliary transmission device 200 is disposed on one and the same axial line as the rotary shaft 180 of the output pulley 150. Because of this, referring to FIG. 4, the auxiliary transmission device 200 as positioned at A and the output pulley 150 are located in the upper portion of the transmission system. In consequence, the auxiliary transmission device 200 is spaced apart from the oil pool position 40 in the lower portion of the transmission system.

The auxiliary transmission device 200 includes a Ravigneux type composite planetary gear device 210, two braking devices 230 and 240, and a clutch device 250.

The Ravigneux type composite planetary gear device 210 is constituted by elements including: a first sun gear 212 and a second sun gear 214; a first planetary gear 216 being in mesh with the first sun gear 212; a second planetary gear being in mesh with this first planetary gear 216 and the second sun gear 214; a ring gear 220 being in mesh with the first planetary gear 216 and a carrier 222 for rotatably supporting the first planetary gear 216 and the second planetary gear 218.

The elements of the above-described Ravigneux type composite planetary gear device 210, the two braking devices 230 and 240, and the clutch device 250 are connected to each other between the rotary shaft 180 of the input pulley 150 and an output shaft 310 of the reduction gear device 300 in the following manner. Namely, the first sun gear 212 is connected to the rotary shaft 180 through the clutch device 250, and the second sun gear 214 is directly connected to the rotary shaft 180 through the spline coupling. Furthermore, the first sun gear 212 has the braking device 230 between the partition member 12a and itself. Similarly, the ring gear 220 has the braking device 240 between the partition member 12a and itself. The carrier 222 as an output member is spline-coupled to the output shaft 310 of the reduction gear device 300. Namely, the carrier 222 and the output shaft 310 are detachably, power-transmissibly coupled to each other.

With the above-described connecting arrangement, the auxiliary transmission device 200 may obtain shift speeds including two forward speeds and one backward speed by selectively feeding an working hydraulic pressure to each hydraulic pressure servo device of the two braking devices 230, 240 and the clutch device 250.

The forward-first speed.

The braking device 230 is put into the working condition, the clutch device 250 and the braking device 240 are put into non-working conditions, so that this forward-first speed can be established. In the conditions described above, the rotary force is inputted from the second sun gear 214, the first planetary gear 216 and the second planetary gear 218 are rotated by second sun gear 214, and a planetary revolution on the first sun gear 212 fixed by the braking device 230 is taken from the carrier 222 into the output shaft 310 in a manner so as to be reduced in speed.

The forward-second speed.

The clutch device 250 is put into the working condition, the braking devices 230 and 240 are put into non-working conditions, so that this forward-second speed can be established. In the conditions described above, the rotary force is simultaneously inputted from the first sun gear 212 and the second sun gear 214, the Ravigneux type composite planetary gear device 210 comes into an integrally rotating condition. Because of this, input rotations are taken off into the carrier 222 as is.

The reverse speed.

The braking device 240 is put into the working condition, the clutch device 250 and the braking device 230 are put into non-working conditions, so that this reverse speed can be established. In the conditions described above, the rotary force is inputted from the second sun gear 214, the first planetary gear 216 and the second planetary gear 218 are rotated by this second sun gear, a planetary revolution on the internal teeth of the ring gear 220 fixed by the braking device 240 is taken off from the carrier 222 in a manner so as to be reduced in speed and in a reverse rotating condition.

Figure 3:
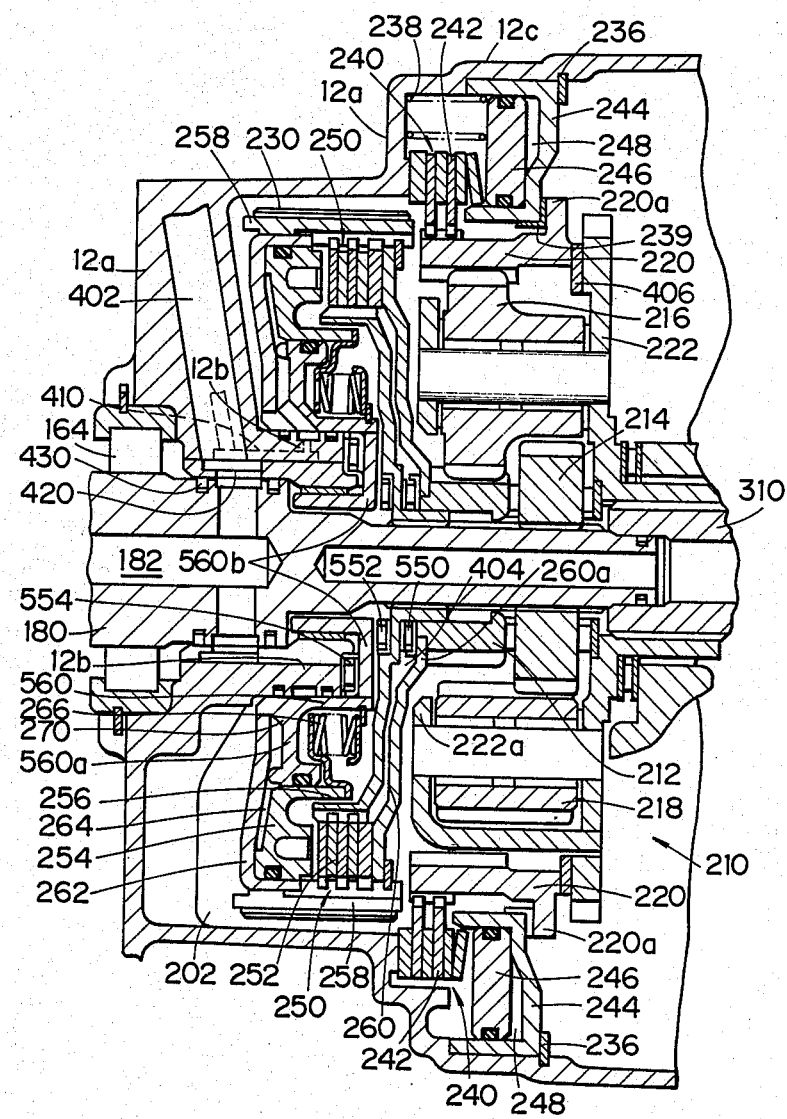
FIG. 3 is an enlarged sectional view showing the auxiliary transmission device.

Description will now be given of the construction of the auxiliary transmission device 200 for transmitting the power from the clutch device 250 to the planetary gear device 210. Firstly, as shown in FIG. 3, the clutch device 250 disposed in front part of the auxiliary transmission device 200 (left part in FIG. 3) is of the friction multi-plate engaging type. As is well known, in the clutch device 250 of the friction multi-plate engaging type, there is provided a frictionally engaging member 252 wherein a plurality of disc plates and a plurality of friction plates are assembled together between a hub 256 and a drum 258. The hub 256 is spline-coupled at the inner end thereof to the rotary shaft 180 in a manner to be integral in the rotating direction, but slidable in the axial direction. The drum 258 is power-transmissibly connected to the first sun gear 212 through a disc-shaped flange member 260.

The inner end portion 260a of the flange member 260 is integrally connected to the first sun gear 212 by welding. The connection between the inner end portion 260a of this flange member 260 and the first sun gear 212 is made at a position in a hollow space 404 formed by the carrier 222a of the side of the flange member 260 and the first sun 212. More specifically, the inner end of the carrier 222a is not extended inwardly in the radial direction, formed to be somewhat short, and forms the hollow space 404 between the first sun gear and itself. The inner portion 260a of the flange member 260 is bent to the direction of this hollow space 404 to be connected to the first sun gear 212 in the hollow space 404. In consequence, the position where the first sun gear 212 is connected to the inner portion 260a of the flange member 260 is located radially inwardly of the carrier 222a and also within the axial width of the carrier 222a. As the result, the axial length of the transmission system can be decreased by the axial width of the carrier 222a.

The first sun gear 212, to which the flange member 260 is integrally connected, is formed of a helical gear, and, referring to FIG. 3, generates a thrust force to the left by the meshing engagement with the planetary gear 216 during the power transmission. This thrust force is received by the inner peripheral portion of the hub 256, a base portion 560b of a U-shape in cross section to be described hereunder, and a projected portion 12b of the partition member 12a through thrust bearings 550, 552 and 554 interposed between the hub 256 and the base portion 560b.

To return to the general description of the clutch device 250, a piston 254 is coupled to a cylinder member 262, and, when the working hydraulic pressure is fed to a working oil chamber 264 defined by the cylinder member 262, the piston 254 is operated to bring a frictionally engaging member 252 into an engagement. This engagement rotatably connects the rotary shaft 180 and the first sun gear 212, whereby rotation of the rotary shaft 180 is transmitted to the first sun gear 212.

In a member 560 connected to the inner peripheral portion of the cylinder member 262, a projected portion 560a projecting radially outwardly is formed. Because of this, the piston 254 is annularly coupled to a position radially outwardly of the cylinder member 262. This is an arrangement for decreasing a pressure receiving area of the piston 254. Engaged with the piston 254 is a return spring 266 for returning the piston 254 from the operating condition thereof.

The base portion 560b of the member 560 is of a U-shape in cross section and secured to the projected portion 12b of the partition member 12a through a thrust bearing 554. With this arrangement, a thrust force generated in the cylinder member 262 can be received by the projected portion 12b of the partition member 12a, so that the arrangement thereof can be simplified. More specifically, when there would be no partition member 12a, an arrangement should be adopted that the thrust force generated in the cylinder member 262 be received by the rotary shaft 180, whereby the arrangement for receiving the thrust force should necessarily be complicated and difficult. Additionally, in this case, the relative rotational speed is disadvantageously high.

Further, a working hydraulic pressure is fed to a working hydraulic oil chamber 264 through an oil line 270 formed in the member 560. The working hydraulic pressure is fed to the oil line 270 through an oil line formed in the partition member 12a.

Furthermore, the transmission system is provided with a hydraulic pressure control device, to control the working hydraulic pressure fed to a hydraulic servo device of the clutch device 250, the braking devices 230 and 240 of the auxiliary transmission device 200, to control the shift speeds of the belt type CVT device 100, and further, to control the fluid coupling device 50. The hydraulic control device is provided thereon with a valve body including various hydraulic pressure control valves.

The valve body is divided into two bodies, i.e. a first valve body 20 and a second valve body 30. The first valve body 20 is provided in the lower portion of the transmission system and close to the oil pool position 40, as shown in FIG. 4. The second valve body 30 is provided in the upper portion of the transmission system, as shown in FIGS. 2(a) and 4. The disposed position of the second valve body 30 is close to the position A in FIG. 4, where the auxiliary transmission device 200 is disposed.

The hydraulic pressures fed to the working oil chamber 264 of the clutch device 250 and the working oil chambers of the braking devices 230 and 240, which are to be described hereunder, are controlled by a shift valve and the like provided in the second valve body 30 as shown in FIGS. 2(a) and 4, and are supplied. The second valve body 30 is provided at the upper position, and, the auxiliary transmission device 200 is also disposed at the position A in an upper position as shown in FIG. 4, whereby the second valve body 30 and the auxiliary transmission device 200 are disposed at positions close to each other. Additionally, the first valve body 20 is disposed at a lower position. Furthermore, the fluid coupling device 50 is disposed at a position B shown in FIG. 4, and a differential gear device 350 is located at a position C.

The second valve body 30 is provided with various valves such as a shift valve and a timing valve which control the operation of the auxiliary transmission device 200. In general, the working hydraulic pressure controlled and supplied through these valves is fed through orifices. Because of this, when the second valve body 30 and the auxiliary transmission device 200 are spaced far away from each other, such a disadvantage may be presented that the responsiveness in speed change is not good due to the orifice actions. In this embodiment, as described above, the second valve body 30 and the auxiliary transmission device 200 are disposed close to each other, whereby short oil lines between the valves and the clutch device 250, the braking devices 230 and 240 can be formed. Therefore, such an advantage can be offered that even when the valves are provided with orifices and the working hydraulic pressures are supplied through the orifices, hydraulic servo devices can be operated rapidly in accordance with supply of working hydraulic pressure from the valves, whereby the responsiveness in speed change is good.

The first valve body 20 normally includes a pressure regulator valve, a sheave control valve, a throttle valve, a lock-up clutch control valve and the like. The pressure regulator valve is a valve for regulating a so-called line pressure, the sheave control valve is a valve for controlling the working hydraulic pressure fed to the input pulley 110, the throttle valve is a valve for generating the hydraulic pressure corresponding to an engine load, and the lock-up clutch control valve for controlling the working of the lock-up clutch 60.

The hydraulic pressure from the oil pump device 70 is firstly delivered to the first valve body 20, and subsequently, to the second valve body 30. The working hydraulic pressure, various control hydraulic pressures and/or the lubricating hydraulic pressure are fed to predetermined positions from the first valve body 20 or the second valve body 30. The feeds of these various hydraulic pressures are mostly performed through oil lines formed in the partitions member 12a and oil lines formed in the portion where the second valve body 30 is mounted. An oil line communicating the first valve body 20 with the second valve body 30 is formed on the surface of the main case member 12 where the oil pump is mounted. Also, there is formed a suction-discharge oil line of the oil pump device 70. Further, an oil line for feeding the hydraulic pressure to the input pulley 110, bearing lubrication holes and an oil hole communicating the first valve body 20 with an upper portion are formed between the input pulley 110 and the above-described surface where the oil pump is mounted. In this embodiment, the provision of the partition member 12a as described above makes it possible that the oil line arrangement communicating various valves with one another can be easily made up without making the arrangement complicated.

Additionally, the details of these various valves and the hydraulic pressure control circuit showing the connection therebetween, disclosed in Japanese Patent Application No. 12017/1984 proposed separately of the present application, will be described later.

The braking device 230 of the auxiliary transmission device 200 is of a well known brake band type and disposed around the outer periphery of the drum member 258 of the clutch device 250.

As detailed in FIG. 3, the braking device 240 is of the friction multi-plate engaging type. The friction multi-plate engaging member 242, wherein disc plates and friction plates are superposed on one another, is provided between the ring gear 220 and a portion 12c of the partition member 12a formed into a drum. A piston 246 is coupled to a cylinder member 244 being of a U-shape in cross section. The working hydraulic pressure is fed to a working oil chamber 248 defined by the cylinder member 244, whereby the piston 246 is actuated to bring the frictionally engaging member 242 into an engaged condition, so that the ring gear 220 is fixed to the partition member 12a. The piston 246 is provided with a return spring 238 adapted to return the piston 246 from the working condition.

The radially outward end of the cylinder member 244 is determined in position in the axial direction and fastened to the drum-like portion 12c of the partition member 12a by a cover ring 236, and the inward end thereof is abutted against a portion 220a projected outwardly from the ring gear 220 in the axial direction through a member 239. Additionally, the member 239 is a so-called bearing member for securing a smooth motion when the cylinder member 244 and a projected portion 220a of the ring gear 220 rotate and slide relative to each other, and is formed of a copper material. Referring to FIG. 3, the right end of the ring gear 220 contacts the carrier 222 through a member 406. However, as will be described hereunder, the direction of the thrust force of the ring gear 220 is directed to the left in FIG. 3, whereby an excessive load is not imposed on the member 406. Because of this, the member 406 is formed of a resin material.

The braking device 240 generates a thrust force (about 2 tons) directed to the right in FIG. 3 during its action in the cylinder member 244 as a reaction force to an action of the piston. Additionally, the ring gear 220 is in helical gear mesh with the first planetary gear 216, whereby a thrust force (about 400 kg) is generated in the ring gear 220. The direction of this thrust force is reverse to the direction of the thrust force generated in the cylinder member 244, i.e., the thrust force directed to the left in FIG. 3. As a result, the thrust forces in the cylinder member 244 and the ring gear 220 are opposite each other. Both the thrust forces are offset by the abutment of the inner end of the cylinder member 244 against the projected portion 220a of the ring gear 220. In this case, since the thrust force of the cylinder member 244 is larger than the thrust force of the ring gear 220, the thrust force of the cylinder member 220 apparently comes to be in the state of being reduced by the value of the thrust force of the ring gear 220. Because of this, the cover ring 236 for receiving the thrust force of the cylinder member 244 may receive the thrust force of the cylinder member 244 obtained by subtracting therefrom the value of the thrust force of the ring gear 220, whereby the cover ring 236 advantageously becomes high in mechanical strength, so that premature fatigue can be avoided and durability can be improved.

Now, the auxiliary transmission device chamber 202 housing the auxiliary transmission device 200 and the belt type CVT device chamber 102 housing the belt type CVT device 100 are partitioned from each other by the partition member 12a of the main case member 12. The partition member 12a partitioning the auxiliary transmission device chamber 202 from the belt type CVT device chamber 102 is partially formed with a stepped portion 600. As shown in FIG. 2(a), the stepped portion 600 is formed at a position between the hydraulic cylinder device 130 of the input pulley 110 and the auxiliary transmission device 200, the stepped portion 600 includes a first small-diameter stepped portion 602 and a second large-diameter stepped portion 604 when viewed from the side of the auxiliary transmission device chamber 202.

The hydraulic cylinder device 130 of the input pulley 110 is provided at the position of the belt type CVT device chamber 102 opposed to the position of the first stepped portion 602, whereby the distance across the shafts of the input pulley 110 and the output pulley 150 can be decreased. In other words, if the stepped portion 600 as a whole is formed by the size of the second stepped portion 604, then the distance across the shafts of the input pulley 110 and the output pulley 150 is lengthened by the value of the step between the first stepped portion 602 and the second stepped portion 604, whereby the transmission system becomes large-sized accordingly. However, according to the present invention, conversely, the distance across the shafts can be decreased by the value of the step, so that the transmission system can be compact in size.

Provided at the position of the auxiliary transmission device chamber 202 opposed to the position of the first stepped portion 602 is the clutch device 250 of the friction multi-plate engaging type, and the braking device 230 of the brake band type is disposed around the outer peripheral portion of the clutch device 250. Since the braking device 230 of the brake band type does not require much space in the radial direction, the braking device 230 can be disposed at the position of the first small-diameter stepped portion 602.

Next, provided at the position of the auxiliary transmission device 202 opposed to the position of the second stepped portion 604 are the planetary gear device 210 and the braking device 240 of the friction multi-plate engaging type. The braking device 240 is disposed at a position radially outwardly of the planetary gear device 210. With this positional arrangement, the auxiliary transmission device 200 can be reduced in axial length. In other words, when the planetary gear device 210 and the braking device 240 are arranged in the axial direction, the axial length is lengthened accordingly. However, when these devices are arranged in the radial direction according to the present invention, the auxiliary transmission device 200 as a whole can be reduced in axial length by a value of the axial length of the braking device 240, so that the transmission system can be made compact in size.

As described above, interposed between the auxiliary transmission device 200 and the belt type CVT device 100 is the partition member 12a partitioning the both devices 200 and 100 from each other. The partition member 12a is provided therein with a bearing 164 for supporting the rotary shaft 180, an oil line 410 for feeding the working hydraulic pressure to the clutch device 250 and an oil line 402 for feeding the working hydraulic pressure to the hydraulic cylinder device 170 of the output pulley 150. The oil line 402 is communicated with the oil line 182 formed in the rotary shaft 180. A seal member 430 such as an O-ring is provided at the opposite side positions of an oil line connecting portion 420 between the oil line 402 of the partition member 12a and the oil line 182 of the rotary shaft 180. This seal member 430 affects the sealing of the oil line connecting portion 420 between the oil lines 402 and 182.

The bearing 164 for supporting the rotary shaft 180 is disposed leftwardly of the partition member 12a in FIG. 3, and disposed rightwardly of the oil lines 402 and 410. Now, the output pulley 150 is subject to a load during the power transmission by the transmission belt 190, to cause flexible deformation. This flexible deformation is caused to have the bearing 164 as the support point and little adverse influence of the flexible deformation is given to the side of the auxiliary transmission device 200 from the bearing 164. In consequence, no adverse influence of the flexible deformation is given to the oil line connecting portion 420 between the oil line 402 in the partition member 12a for feeding the working hydraulic pressure to the hydraulic cylinder device 170 of the output pulley 150 and the oil line 182 in the rotary shaft 180, so that the seal member 430 provided at the opposite side positions of the oil line connecting portion 420 can avoid the premature fatigue. Because of this, the seal member 430 can be held in a satisfactory condition for a long period of time, thus enabling avoiding lowered sealing performance.

Furthermore, the bearing 164 is disposed to the leftward position, so that the oil line 410 for feeding the working hydraulic pressure to the clutch device 250 of the auxiliary transmission device 200 can be provided at a position radially inwardly, thus enabling to provide the clutch device 250 in the radial direction to be made compact in size. More specifically, when the bearing 164 would be provided rightwardly of the partition member 12a for example, the oil line 410 should be provided radially outwardly of this bearing 164, and further, the clutch device 250 should be provided radially outwardly of this oil line 410, thus presenting the disadvantage of the clutch device 250 becoming large in the radial direction. However, in this embodiment, such disadvantage as described above should not occur.

Now, in this embodiment, the auxiliary transmission device 200 is provided downstream of the belt type CVT device 100 in the power transmission system, so that the belt type CVT device 100 can be made small-sized. Namely, the auxiliary transmission device 200 might be provided at the upstream side of the belt type CVT device 100 in the power transmission system. However, in this case, the torque would be increased in the auxiliary transmission device 200, whereby the belt type CVT device 100 should be required to be large-sized, having a large capacity. However, in this embodiment, the torque is increased downstream of the belt type CVT device 100, so that the capacity of the belt type CVT device 100 may be small and also be small-sized.

Furthermore, when the auxiliary transmission device 200 would be provided at the upstream side of the belt type CVT device 100, the transmission belt 190 of the belt type CVT device 100 would be rotated normally and reversely, whereby the transmission belt 190 should be excessively used, thus resulting in lowered durability. However, in this embodiment, the forward-backward shift is made downstream of the belt type CVT device 100, whereby the transmission belt 190 is rotated in the same rotating direction all the time, thus improving the durability of the transmission belt 190.

Further, the auxiliary transmission device chamber 202 housing the auxiliary transmission device 200 is formed by the partition member 12a of the main case member 12 into an independent chamber, so that, in the auxiliary transmission device 200, the replacement of parts, repairing and the like can be performed without adverse influence to the assembled states of other devices including the belt type CVT device 100, fluid coupling device 50 and reduction gear device 300. More specifically, the power transmission connections with the adjacent devices of this auxiliary transmission device 200 are made such that, firstly, with the rotary shaft 180 of the output pulley 150 of the belt type CVT device 100, the second sun gear 214 is detachably spline-coupled to this auxiliary transmission device 200, and with the output shaft 310 of the reduction gear device 300, the carrier 222 is detachably spline-coupled to this auxiliary transmission device 200, so that, in this auxiliary transmission device 200, the disassembly and assembly can be independently performed without adverse influence to the assembled states of the adjacent other devices.

As described above, in this embodiment, description has been given to the case where the auxiliary transmission device 200 is provided on the output side of the belt type CVT device 100, however, of course, such an arrangement may be adopted that the auxiliary transmission device 200 is provided on the input side of the belt type CVT device 100.

The reduction gear device 300.

The reduction gear device 300 is provided on the output side of the auxiliary transmission device 200. In this reduction gear device 300, a gear 312 provided on the output shaft 310 as the rotary shaft is in mesh with a first gear 322 of an intermediate shaft 320, and a second gear 324 of the intermediate shaft 320 is in mesh with a final reduction gear 330. The meshing engagements between these gears are for the reduction rotations. With this arrangement, rotation from the auxiliary transmission device 200 is reduced in speed by this reduction gear device 300 and transmitted to a differential gear device 350. Additionally, the output shaft 310 is supported by bearing 802 and 804 at opposite sides and the intermediate shaft 320 is supported by bearings 812 and 814 at opposite sides.

In FIG. 2(a), the output shaft 310 as the rotary shaft is spline-coupled at the left end portion thereof to the inner end of the carrier 222 as an output member of the Ravigneux type composite planetary gear device 210 in a manner to be integral in the rotating direction, but slidable in the axial direction. In other words, the output shaft 310 is detachably connected to the carrier 222 in the axial direction.

Furthermore, the output shaft 310 is coaxially provided with the rotary shaft 180 of the output pulley 150, with the end portion of the rotary shaft 180 being coupled into the output shaft 310. Provided in this coupled portion is a seal member 308 such as a seal ring, which renders a lubrication path 318, which will be described hereunder, oil-tight. Additionally, the output shaft 310 and the rotary shaft 180 are coupled to each other in a manner to be rotatable relative to each other and detachable in the axial direction.

A lubrication path 314 communicating the axis portions of the output shaft 310 and the rotary shaft 180 of the output pulley 150 is provided. In FIG. 2(a), this lubrication path 314 has an opening at the right shaft end of the output shaft 310, and lubricating oil is fed to t he lubrication path 314 through this opening. At a position of the rotary shaft 180 of the output pulley 150, the lubrication path 314 is provided with a feeding oil line 820 communicated with portions to be lubricated of the auxiliary transmission device 200, whereby lubricating oil is fed to the portions for lubrication and the portions are lubricated accordingly.

Furthermore, a lubrication path 850 is formed in the axis portion of the intermediate shaft 320, whereby a bearing 812 is lubricated. Lubricating oil is supplied form a lubricating oil feed path 900 indicated by broken lines to this lubrication path 850 and the lubrication path 314 of the aforesaid output shaft 310.

As described above, the auxiliary transmission device 200 is lubricated by the provision of the lubrication paths in the output shaft 310 and the rotary shaft 180 of the output pulley 150, so that lubricating arrangement can be simplified. More specifically, the auxiliary transmission device 200 si interposed between the belt type CVT device 100 and the reduction gear device 300, whereby, normally the lubricating arrangement becomes complicated and difficult. However, the lubrication path 314 is provided in the rotary shaft 180 and the output shaft 310 and the lubricating oil is taken in through the shaft end of the output shaft 310, whereby the feeding of lubricating oil is facilitated, so that the lubricating arrangement can be simplified.

Furthermore, since the output shaft 310 of the reduction gear device 300 is detachably mounted to the carrier 222 as the output portion of the auxiliary transmission device 200 and the rotary shaft 180 of the output pulley 150, the reduction gear device 300 can be disassembled and assembled without any adverse influence to the auxiliary transmission device 200.

The differential gear device 350.

The differential gear device 350 is provided on the final reduction gear 330 in the well known arrangement. More specifically, pinion 356 and 358, which are supported by a pinion shaft 360 are in mesh with a pair of right and left side gears 352 and 354, the rotational force is transmitted from a differential gear case 362, through the pinion shaft 360, pinions 356 and 358, to the side gears 352 and 354. Then, the rotational force is transmitted from the side gears 352 and 354, through driving shafts 370 and 372 to wheels (not shown). Then, differential rotations of the right and left wheels are permitted by the rotations of the pinions 356 and 358.

Figure 5A:
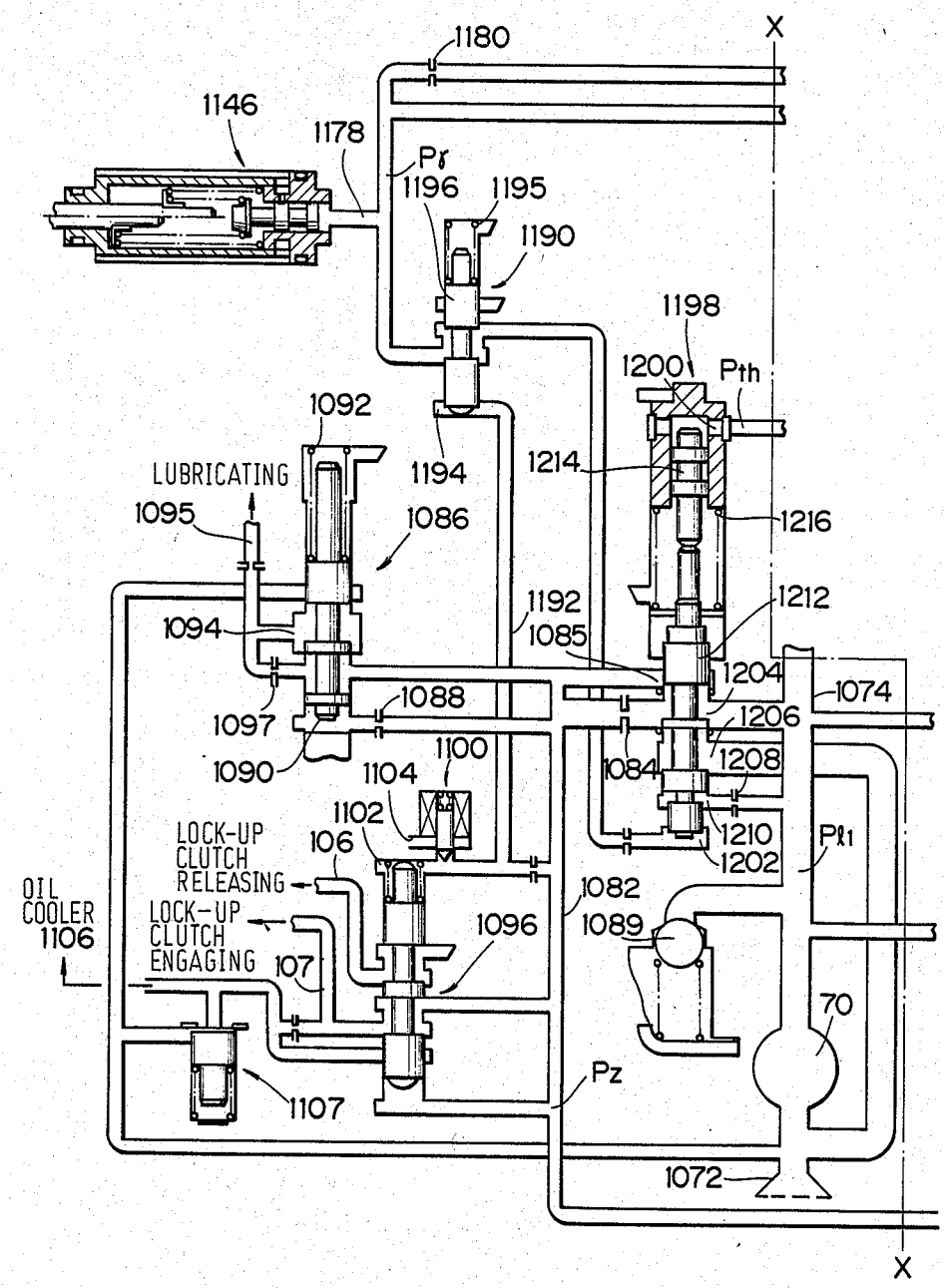
FIGS. 5(a), 5(b) and 5(c) are hydraulic pressure circuit diagrams showing the hydraulic pressure control device.
Figure 5B:
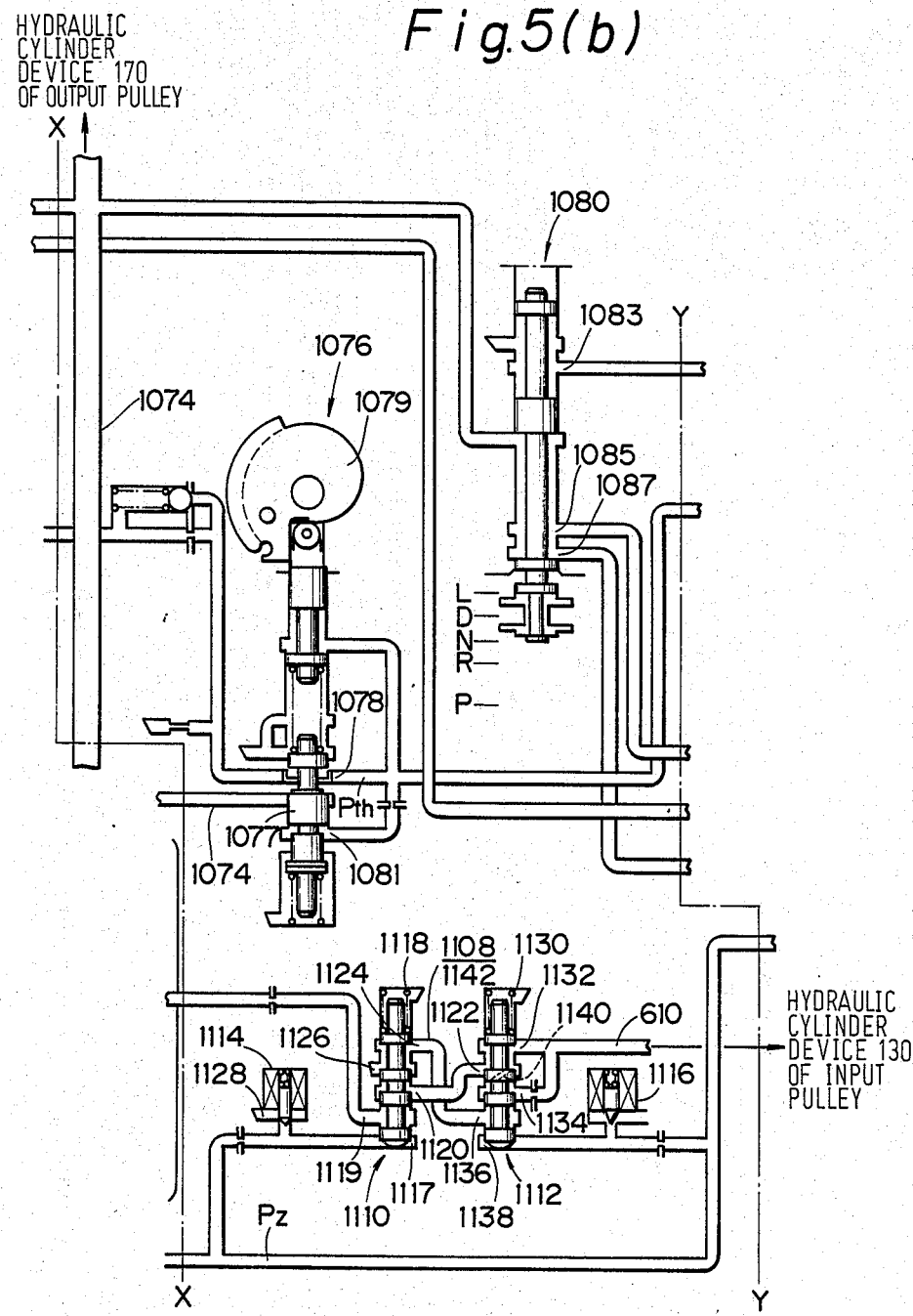
Figure 5C:
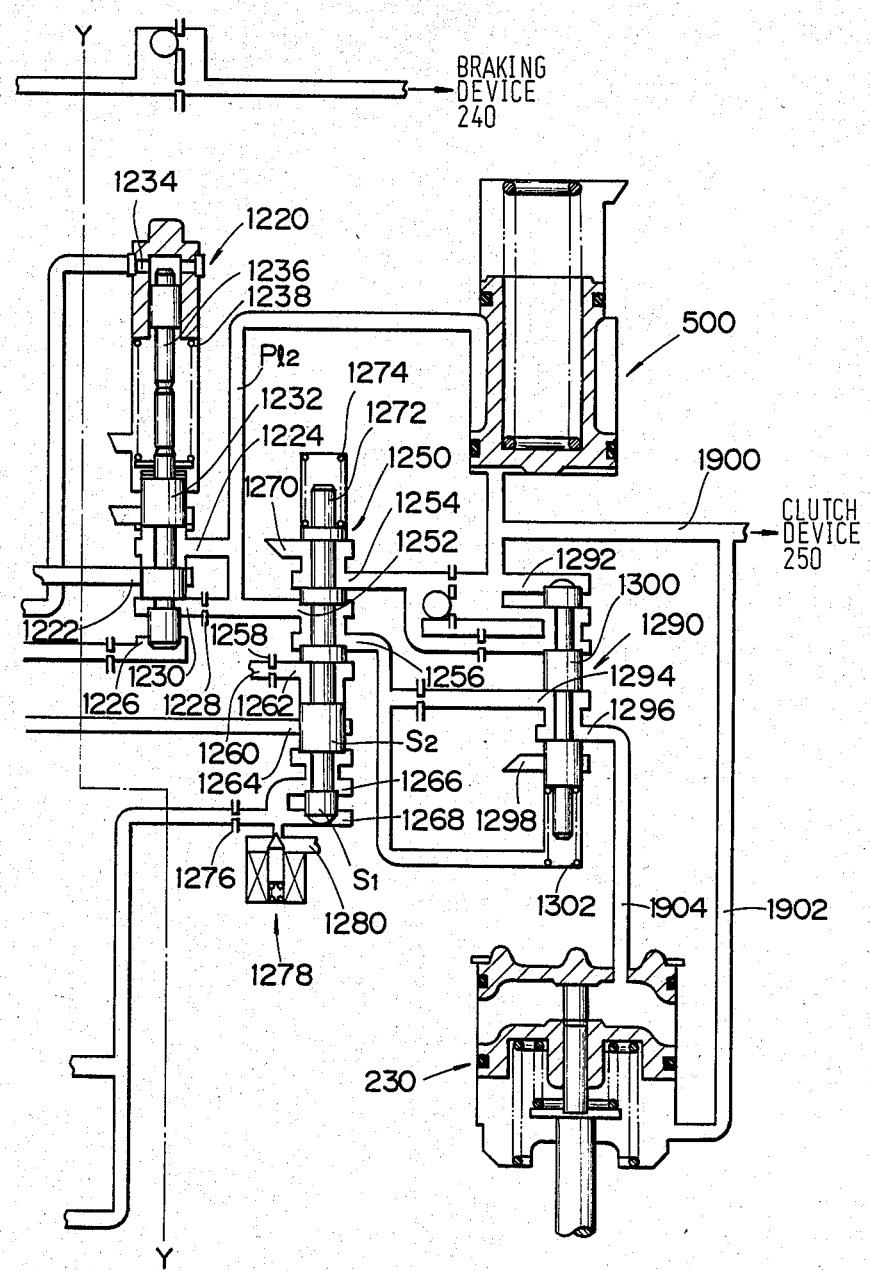

Next, FIGS. 5(a) through 5(c) show the hydraulic pressure control circuits in detail.

Additionally, in FIGS. 5(a) and 5(c), the respective hydraulic pressure circuits are connected by a line X—X and, in FIGS. 5(b) and 5(c), the respective hydraulic pressure circuits are connected by a line Y—Y, thus generally constituting one hydraulic pressure circuit.

The oil pump device 70 pressurizes oil taken in through a strainer 1072 and feeds the same to a line pressurized oil path 1074.

A throttle valve 1076 generates a throttle pressure Pth associated with an intake throttle opening $\theta$ in an output port 1078. A spool 1077 of the throttle valve 1076 confrontingly receives a working force increased with the increase of the throttle opening $\theta$ from a throttle cam 1079 and the throttle pressure Pth as being a feedback pressure from a control port 1081, and controls the connection between the line pressurized oil path 1074 and the output port 1078.

A manual valve 1080 is interlocked with a shift lever (not shown), which is provided in the driver's cab, and moves in the axial direction in association with control positions of the shift lever. As the normal control positions of the shift lever, there are provided ranges L(Low), D(Drive), N(Neutral), R(Reverse) and P(Park). During the range R, a first line pressure $PL_1$ of the line pressurized oil path 1074 is led to a port 1083, similarly, during the range L, led to a port 1085, during the range D, led to ports 1085 and 1087.

A relief valve 1089 is provided as a so-called safety valve for relieving the oil in the line pressurized oil path 1074 when the first line pressure $PL_1$ of the line pressurized oil path 1074 exceeds a predetermined value.

A secondary hydraulic pressure oil line 1082 is connected to the line pressurized oil path 1074 through an orifice 1084 and the port 1085, into which oil in excess of a primary pressure regulator valve 1198 is discharged. A secondary pressure regulator valve 1086 has a control chamber 1090 connected to the secondary hydraulic pressure oil line 1082 through an orifice 1088 controls the connection between the secondary hydraulic pressure oil line 1082 and the port 1094 in association with the hydraulic pressure of the control chamber 1090 and a load of a spring 1092, and holds a secondary hydraulic pressure Pz of the secondary hydraulic pressure oil line 1082 at a predetermined value.

A lubricating oil path 1095 is connected to the secondary hydraulic pressure oil path 1082 through the port 1094 or an orifice 1097. A lock-up clutch control valve 1096 provided for controlling the lock-up clutch 60 selectively connects the secondary hydraulic pressure oil line 1082 to either an oil line 107 on the engaging side or an oil line 106 on the releasing side of the lock-up clutch 60.

A solenoid valve 1100 controls the connection between a control chamber 1102 of the lock-up clutch control valve 1096 and a drain 1104. When the solenoid valve 1100 is off (i.e. non-excited), a secondary hydraulic pressure Pz from the secondary hydraulic pressure oil line 1082 is fed to the oil line 106 on the releasing side of the lock-up clutch 60, whereby lock-up clutch 60 is released, so that the engine power can be transmitted through the fluid coupling 54. When the solenoid valve 1100 is on (i.e. excited), the secondary hydraulic pressure Pz from the secondary hydraulic pressure oil line 1082 is fed to the oil line 107 on the engaging side of the lock-up clutch 60 and an oil cooler 1106, whereby the engine power is transmitted through the lock-up clutch 60. Additionally, a cooler bypass valve 1107 controls the pressure of cooler to a predetermined value of pressure.

A transmission gear ratio control device 1108 controls the input pulley 110 of the belt type CVT device 100, and includes a first and second spool valves 1110 and 1112 (i.e. sheave control valves), and a first and a second solenoid valves 1114 and 1116. During the period of the first solenoid valve 1114 being off, a spool of the first spool valve 1110 is urged toward a spring 1118 by the secondary hydraulic pressure Pz of a chamber 1117, the first line pressure $PL_1$ of a port 1119 is delivered to a port 1122 of the second spool valve 1112 through a port 1120 of the first spool valve 1110, and a port 1124 and a drain 1126 are disconnected from each other. During the period of the first solenoid valve 1114 being on, the hydraulic pressure of the chamber 1117 is discharged through a drain 1128 of the first solenoid valve 1114, the spool of the first spool valve 1110 is urged toward the chamber 1117 through the resiliency of the spring 1118, a line pressure PL is not generated in the port 1120, and the port 1124 is connected to the drain 1126. Furthermore, during the period of the second solenoid valve 1116 being off, a spool of the second spool valve 1112 is urged toward a spring 1130 by the secondary hydraulic pressure Pz of the chamber 1117, a port 1122 and a port 1132 are disconnected from each other, and a port 1134 is connected to a port 1136. The ports 1132 and 1134 are connected to the first and second working oil chambers 132 and 134 of the hydraulic cylinder device 130 provided on the side of the input pulley 110 of the belt type CVT device 110 through an oil line 610. During the period of the second solenoid valve 1116 being on, the spool of the second spool valve 1112 is urged toward the chamber 1138 through the resiliency of the spring 1130, the port 1122 is connected to the port 1132, and the port 1134 and the port 1136 are disconnected from each other. Then, the port 1136 is connected to the port 1124 through an oil line 1142. During the period of the second solenoid valve 1116 being off, an orifice 1140 leads a small amount of oil to the port 1132 from the port 1122. As a result, during the period in which the first solenoid valve 1114 is off and the second solenoid valve 1116 is on, the working hydraulic pressure is rapidly fed to the first and second working oil chambers 132 and 134 of the hydraulic cylinder device 130 on the side of the input pulley 110 of the belt type CVT device 100, whereby the transmission gear ratio of the belt type CVT device 100 is lowered. During the period in which the first solenoid valve 1114 is off and the second solenoid valve 1116 is off, feeding of the working hydraulic pressure to the hydraulic cylinder device 130 of the input pulley 110 of the belt type CVT device 100 is performed through an orifice 1140, whereby the transmission gear ratio of the belt type CVT device 110 is slowly lowered. During the period in which the first solenoid valve 1114 is on and the second solenoid valve 1116 is on, feeding of the working hydraulic pressure to and the discharge from the hydraulic cylinder device 130 on the side of the input pulley 110 of the belt type CVT device 100 are not performed, whereby the transmission gear ratio of the belt type CVT device 100 is held at a constant value. During the period in which the first solenoid valve 1114 is on and the second solenoid valve 1116 is off, the working hydraulic pressure of the hydraulic cylinder device 130 on the side of the input pulley 110 is discharged through the drain 1126, whereby the transmission gear ratio of the belt type CVT device 100 is rapidly raised.

A transmission gear ratio sensing valve 1146, sensing the movement of the movable pulley 114 of the input pulley 110 shown in FIG. 2(a), generates a hydraulic pressure of transmission gear ratio Pr corresponding to the transmission gear ratio of the belt type CVT device 100. The hydraulic pressure of transmission gear ratio Pr controlled by the transmission gear ratio sensing valve 1146 is generated in an output port 1178. Additionally, as shown in FIG. 2(a), the transmission gear ratio sensing valve 1146 is positioned in the axis portion of the rotary shaft 104 of the input pulley 110. The transmission gear ratio sensing valve 1146 illustrated in FIG. 2(a) is laterally converse to that shown in FIG. 5(a).

A cut-off valve 1190 has a chamber 1194 communicated with the chamber 1102 of the lock-up clutch control valve 1096 through an oil line 1192 and a spool 1196 movable in association with the hydraulic pressure of a chamber 1194 and the resiliency of a spring 1195. When the solenoid valve 1100 is off, i.e., the lock-up clutch 60 is brought into a released state (when the speed change is made in the auxiliary transmission device 200, the lock-up clutch 60 is brought into a released state in order to absorb an impact in the power transmission system), the cut-off valve 1190 is brought into a closed state to prevent the hydraulic pressure of transmission gear ratio Pr from being transmitted to the primary pressure regulator valve 1198.

The primary pressure regulator valve 1198 as being a first line pressure generating means comprises:

a port 1200, to which the throttle pressure Pth is fed;

a port 1202, to which the hydraulic pressure of transmission gear ratio Pr is fed;

a port 1204 connected to the line pressure oil line 1074;

a port 1206 connected to the suction's side of the oil pump 70;

a port 1220, to which the first line pressure $PL_1$ is fed through an orifice 1208;

a spool 1212 axially movable for controlling the connection between the port 1204 and the port 1206;

a spool 1214 for receiving the throttle pressure Pth to urge the spool 1212 toward the port 1202; and a spring 1216 for urging the spool 1212 toward the port 1202.

This primary pressure regulator valve 1198 is controlled under the comparison between the hydraulic pressure of transmission gear ratio Pr and the throttle pressure Pth, generates the first line pressure $PL_1$ in the line pressure oil line 1074. This first line pressure $PL_1$ is used as the working hydraulic pressure for the respective hydraulic cylinder devices 130 and 170 of the input pulley 110 and the output pulley 150 of the belt type CVT device 100 shown in FIG. 2(a).

A sub-primary pressure regulator valve 1220 as being a second line pressure generating means comprises:

an input port 1222, to which the first line pressure $PL_1$ is led from the port 1085 of the manual valve 1080 during the ranges of L and D;

an output port 1224, in which the second line pressure $PL_2$ is generated;

a port 1226, to which the hydraulic pressure of transmission gear ratio Pr is led;

a port 1230, to which the second line pressure $PL_2$ as being the feedback pressure is led through an orifice 1228;

a spool 1232 for controlling the connection between the input port 1222 and the output port 1224;

a port 1234, to which the throttle pressure Pth is led;

a spool 1236 for receiving the throttle pressure Pth from the port 1234, to urge the spool 1232 toward the port 1226; and a spring 1238 for urging the spool 1232 toward the port 1226.

This sub-primary pressure regulator valve 1220 is also controlled under the comparison between the hydraulic pressure of transmission gear ratio Pr and the throttle pressure Pth, and generates the second line pressure $PL_2$ in the output port 1224. This second line pressure $PL_2$ is used as the working hydraulic pressure for shifting the forward speeds in the auxiliary transmission device 200 shown in FIG. 2(a).

A shift valve 1250 comprises:

an input port 1252, to which the second line pressure $PL_2$ is led during the ranges D and L of the manual valve 1080;

a port 1262 connected to a drain 1260 through output ports 1254, 1256 and an orifice 1258;

a control port, to which the first line pressure $PL_1$ is fed from the port 1087 of the manual valve 1080 during the range D;

other control ports 1266 and 1268;

a drain 1270;

a spool 1272; and a spring 1274 for urging the spool 1272 toward the port 1268.

The second hydraulic pressure Pz is led to the control ports and 1268 through an orifice 1276, and the hydraulic pressures of these control ports 1266 and 1268 are controlled by a solenoid valve 1278. Two lands S1 and S2 counted from below the spool 1272 have a relationship of S1 smaller than S2 in area. Furthermore, the solenoid valve 1278 is on-off controlled in association with the operation parameters of the vehicle, and, when the solenoid valve 1278 is on, oil is discharged from a drain 1280.

When the spool 1272 is positioned on the side of the spring due to the control of the solenoid valve 1278, the input port 1252 is connected to the output port 1254, and the output port 1256 is connected to the drain 1260 through the port 1262 and the orifice 1258. Therefore, the second line pressure $PL_2$ is fed to the hydraulic pressure servo device of the clutch device 250 from the output port 1254, whereby the auxiliary transmission device 200 is shifted to the forward-second speed.

Conversely, when the spool 1272 is positioned on the side of the port 1268 due to the control of the solenoid valve 1278, the input port 1252 is connected to the output port 1256, and the output port 1254 is connected to the drain 1270. As a result, the second line pressure PL$_2$ from the output port 1256 is fed to the hydraulic pressure servo device of the braking device 230, whereby the auxiliary transmission device 200 is shifted to the forward-first speed.

During the range L, since the first line pressure PL$_1$ is not led to the control port 1264, the solenoid valve 1278 is turned off, whereby the spool 1272 moves toward the spring 1274, due to the secondary hydraulic pressure Pz acting on the land S2 firstly, and due to the secondary hydraulic pressure Pz acting on the land S1 subsequently. When the solenoid valve 1278 is turned on, the hydraulic pressures in the control ports 1266 and 1268 are lowered, whereby the spool 1272 is moved toward the port 1268 through the resiliency of the spring 1274. In other words, during the range L, it becomes possible to shift the forward speeds, namely, a shift between the forward-first speed and forward-second speed in the auxiliary transmission device 200 in association with the on-off operation of the solenoid valve 1278.

During the range D, since the first line pressure PL$_1$ is led to the control port 1264, when the spool 1272 is temporarily positioned on the side of the spring 1274, the first line pressure PL$_1$ from the control port 1264 acts on the land S2, the spool 1274 is held at the position on the side of the spring 1274 irrespective of the subsequent on-off operation of the solenoid valve 1278. As a result, the auxiliary transmission device 200 is constantly held at the forward-second speed.

A shift timing valve 1290 comprises:

a control port 1292 communicated with the hydraulic pressure servo device of the clutch device 250;

an input port 1294 connected to the output port of the shift valve 1250;

an output port 1296 connected to the hydraulic pressure servo device of the braking device 230;

a drain 1298;

a spool 1300; and a spring 1302 for urging the spool 1300 toward the port 1292.

When the shift valve 1250 is changed over from the position of the forward-first speed to the position of the forward-second speed, the second line pressure PL$_2$ is fed to the clutch device 250 from the output port 1254. However, when the hydraulic pressure of the clutch device 250 is still low, the spool 1300 is located at a position on the side of the port 1292 through the resiliency of the spring 1302, whereby the working hydraulic pressure of the braking device 230 is slowly discharged from the drain 1260 through the port 1262 of the shift valve 1250 and the orifice 1258. When the working hydraulic pressure of the clutch device 250 is raised, the spool 1300 is moved by the hydraulic pressure of the port 1292 against the resiliency of the spring 1302, whereby the working hydraulic pressure of the braking device 230 is rapidly discharged from the drain 1298 of the shift timing valve 1290. As the result, when a shift-up to the forward-second speed from the forward first speed is performed in the auxiliary transmission device 200, the release of the braking device 230 is suitably delayed, whereby the shift shock can be decreased.

In the above-described embodiment, the shift valve 1250 and the shift timing valve 1290, which control the clutch device 250 and the braking device 230 of the auxiliary transmission device 200 are provided on second valve body 30 in the upper portion of the transmission system as described above, and disposed at a position close to the auxiliary transmission device 200. Because of this, the oil line 1900 led to the clutch device 250 and oil lines 1902 and 1904 led to the braking device 230 are formed so as to be short, thus showing satisfactory shift responsiveness.

Obviously, numerous modifications and variations of the present invention are possible in light of the above teachings. It is therefore to be understood that within the scope of the appended claims, the invention may be practiced otherwise than as specifically described herein.

What is claimed is:

1. A belt type continuously variable transmission system comprising:

a belt type continuously variable transmission device wherein a transmission belt is racked across an input pulley and an output pulley and rotation is continuously variably transmitted from said input pulley to said output pulley; and an auxiliary transmission device disposed on the output side of the belt type continuously variable transmission device and having at least a forward-reverse shift mechanism, wherein said belt type continuously variable transmission device and said auxiliary transmission device are respectively housed in a belt type continuously variable transmission device housing and an auxiliary transmission device housing, both of which are formed by case members and separated by a radial partition member of said case members into independent sealed housings, respectively, and wherein said auxiliary transmission device is detachable from said continuously variable transmission device housing as an independent unit.

2. A hydraulic control device in a belt type continuously variable transmission system comprising:

an input pulley and an output pulley;

a belt type continuously variable transmission device in which a transmission belt is racked across said input pulley and an output pulley, and a rotational force is transmitted from said input pulley to said output pulley continuously variably, an auxiliary transmission device in which hydraulic pressure servo devices of a braking device and a clutch device are selectively actuated to achieve a predetermined shift speed; said auxiliary transmission device being disposed in the upper portion of said continuously variable transmission system and spaced apart from an oil pool position of said continuously variable transmission system; and a hydraulic control device including a valve body provided with various valves for controlling the shift conditions of said transmission system is divided into two bodies including a first valve body and a second valve body, said first valve body being provided at a position close to said oil pool in the lower portion of said continuously variable transmission system, said second valve body being provided at a position close to said auxiliary transmission device in the upper portion of said continuously variable transmission system, said first valve body having a pressure regulator valve for regulating the hydraulic pressures fed to various portions such as a pressure regulator valve, and said second valve body having valves for controlling the operation of the auxiliary transmission device.

3. A belt type continuously variable transmission system wherein a braking device of a friction multiplate engaging type is interposed between a ring gear of a planetary gear device and a case member, comprising:
- a cylinder member coupled with said braking device with a piston, said cylinder member being formed separately of said case member; said cylinder member being engaged with said case member in an axial direction through a cover ring in such a manner that a thrust force generated in said cylinder member is received by said case member;
- said ring gear of said planetary gear device being disposed in such a manner that a thrust force opposite to a thrust force generated in said cylinder member is generated in said ring gear; and
- an inner end of said cylinder member and a projected portion of said ring gear are abutted against each other to confrontingly receive said thrust forces.

4. A belt type continuously variable transmission system comprising a belt type continuously variable transmission device in which a transmission belt is racked across an input pulley and an output pulley and rotation is continuously variably transmitted from said input pulley to said output pulley, and an auxiliary transmission device disposed on the output side of said belt type continuously variable transmission device and having a clutch device and a braking device, both of which are of a friction multi-plate engaging type and coupled to a planetary gear device, comprising:
- a stepped portion formed in a partition member for partitioning a belt type continuously variable transmission device chamber housing said belt type continuously variable transmission device from an auxiliary transmission device chamber housing said auxiliary transmission device;
- said stepped portion including a first small-diameter stepped portion and a second large-diameter stepped portion when viewed from said auxiliary transmission device chamber;
- a hydraulic cylinder device of said input pulley disposed at the position of said belt type continuously variable transmission device chamber opposed to the position of said first stepped portion;
- said clutch device of friction multi-plate engaging type being disposed at the position of said auxiliary transmission device chamber opposed to said first stepped portion; and
- said braking device of friction multi-plate engaging type being disposed at the position of said auxiliary transmission device chamber opposed to said second stepped portion and at a position radially outwardly of said planetary gear device.

5. A power transmission device in a belt type continuously variable transmission system comprising a planetary gear device and a clutch device of friction multi-plate engaging type, wherein:
- said planetary gear device includes a sun gear, planetary gears supported by a carrier and a ring gear; and said clutch device and said sun gear of said planetary gear device is connected to each other through a disc-shaped flange member wherein a hollow space is formed between the carrier on the side where said flange member is disposed and said sun gear; and
- an inner portion of said flange member is bent in a direction of said hollow space and said sun gear is connected to said flange member in said hollow space position at a position located radially inwardly of the carrier and also within the axial width of the carrier.

6. A belt type continuously variable transmission system including a belt type continuously variable transmission device comprising:
- an auxiliary transmission device including a planetary gear device provided on a rotary shaft of an output pulley of said belt type continuously variable transmission device;
- a rotary shaft of a reduction gear device provided linearly coaxially with the rotary shaft of said output pulley in a manner to be detachable from the rotary shaft of said output pulley and rotatable relative to each other;
- a lubrication path having an opening at the shaft end of the rotary shaft of said reduction gear device formed in the rotary shaft of said reduction gear device and the rotary shaft of said output pulley, and being communicated with each other;
- a seal member provided in a portion wherein the rotary shafts of said reduction gear device and said output pulley are coupled to each other; and
- an output member of said planetary gear device of the auxiliary transmission device spline-coupled to the rotary shaft of said reduction gear device in a manner so as to be integral in a rotating direction, but detachable in an axial direction.

7. A belt type continuously variable transmission system comprising:
- a belt type continuously variable transmission device wherein a transmission belt is racked across an input pulley and an output pulley and rotation is continuously variably transmitted from said input pulley to said output pulley; and
- an auxiliary transmission device in driving connection with the belt type continuously variable transmission device and having at least a forward-reverse shift mechanism,
- wherein said belt type continuously variable transmission device and said auxiliary transmission device are respectively housed in a belt type continuously variable transmission device housing and an auxiliary transmission device housing, both of which are formed by case members and separated by a radial partition member of said case members into independent chambers, respectively, and wherein said auxiliary transmission device is detachable from said continuously variable transmission device housing as an independent unit.

* * * * *